US011363379B2

(12) United States Patent
Ehlert et al.

(10) Patent No.: US 11,363,379 B2
(45) Date of Patent: Jun. 14, 2022

(54) AUDIO/VISUAL DEVICE WITH CENTRAL CONTROL, ASSISTIVE LISTENING, OR A SCREEN

(71) Applicant: Galaxy Next Generation, Inc., Toccoa, GA (US)

(72) Inventors: Bradley J. Ehlert, Sandy, UT (US); Shawn Wheeler, Sandy, UT (US)

(73) Assignee: Galaxy Next Generation, Inc., Toccoa, GA (US)

(*) Notice: Subject to any disclaimer, the term of this patent is extended or adjusted under 35 U.S.C. 154(b) by 0 days.

(21) Appl. No.: 16/439,292

(22) Filed: Jun. 12, 2019

(65) Prior Publication Data

US 2020/0396540 A1    Dec. 17, 2020

(51) Int. Cl.
*H04R 3/12*    (2006.01)
*H04R 5/04*    (2006.01)
*H04L 29/08*    (2006.01)
*H04L 29/06*    (2006.01)
*H04L 67/125*    (2022.01)
*H04L 65/60*    (2022.01)

(52) U.S. Cl.
CPC ............... *H04R 3/12* (2013.01); *H04L 65/60* (2013.01); *H04L 67/125* (2013.01); *H04R 5/04* (2013.01); *H04R 2420/07* (2013.01); *H04R 2430/01* (2013.01)

(58) Field of Classification Search
USPC .......... 381/26, 92, 111, 122, 300; 348/14.1, 348/143, 581, 589
See application file for complete search history.

(56) References Cited

U.S. PATENT DOCUMENTS

| | | | |
|---|---|---|---|
| 10,565,859 B2* | 2/2020 | Gravel | H04W 4/029 |
| 2010/0014004 A1* | 1/2010 | Dai | H03G 7/007 348/734 |
| 2012/0069131 A1* | 3/2012 | Abelow | G06Q 10/067 348/14.01 |
| 2016/0149717 A1* | 5/2016 | Wada | H04L 12/4625 455/414.1 |

* cited by examiner

*Primary Examiner* — Yosef K Laekemariam
(74) *Attorney, Agent, or Firm* — Daniel J. Santos; Smith Tempel Blaha LLC

(57) ABSTRACT

Systems, devices, and methods that utilize assistive listening systems, central control of endpoint devices, and a screen are described herein. Some environments, such as a classroom, may include legacy assistive listening systems. Systems may be configured to coordinate assistive listening functions between the legacy assistive listening system and other audio output devices. In such cases, the audio output devices and/or a stationary device may be used in conjunction with a legacy assistive listening system. The audio output devices and/or the stationary device may be configured to communicate one or more settings for one or more control parameters of the audio output devices. The stationary device may provide centralized control of at least some control parameters of the audio output devices. The stationary device may include a screen or display to output visual data in addition to audio data.

17 Claims, 9 Drawing Sheets

AUDIO/VISUAL DEVICE WITH CENTRAL CONTROL, ASSISTIVE LISTENING, OR A SCREEN

TECHNICAL FIELD

The present disclosure generally relates to audio visual systems that utilize assistive listening systems, central control of endpoint devices, and a screen or display.

BACKGROUND

Networked systems are increasingly important in various organizations. Not all organizations are able to custom build their networked systems to ensure that different devices communicate efficiently. Frequently, an organization may implement a collection of systems, both old and new, to achieve their objectives.

In some settings, such as offices or classrooms, a plurality of network devices and/or media devices may be positioned in a dense environment. It may be desirable to integrate devices in some areas (e.g., conference rooms or classrooms) to improve control and cooperation between devices. The proliferation of devices and the further integration of devices in dense environments may complicate connectivity between devices.

SUMMARY

One aspect of the present disclosure relates to a system that includes a stationary device, an assistive listening system, and an audio output device. The stationary device is communicatively coupled with one or more devices for inputting multimedia content into or outputting multimedia content relative to a classroom. The assistive listening system includes a transmitter and one or more receivers, the transmitter communicatively coupled with the stationary device and the one or more receivers and configured to receive audio content and transmit the audio content to the one or more receivers, the one or more receivers configured to output the audio content to a user. The audio output device is communicatively coupled with the stationary device and configured to output the audio content to the user.

The audio output device may be independent from the assistive listening system. The audio output device may receive the audio content from the stationary device over a first wireless communication link that uses a first radio access technology. The one or more receivers may receive the audio content from the transmitter over a second wireless communication link that uses a second radio access technology different than the first radio access technology. The stationary device may be configured to: receive the audio content from at least one device of the one or more devices for inputting or outputting the multimedia content relative to the classroom; identify that the audio content is part of a presentation that includes assistive listening; and transmit the audio content to the transmitter of the assistive listening system over a first communication link and the audio output device over a second communication link different than the first communication link.

The assistive listening system may be a legacy assistive listening system. The stationary device, the one or more receivers, and the audio output device may be positioned in the classroom. The one or more receivers and the audio output device may be configured as assistive listening devices for a presentation output by the stationary device over a duration.

Another aspect of the present disclosure relates to an audio/visual integration device for a classroom that includes a first audio/visual endpoint, a second audio/visual endpoint, a speaker, and a screen. The first audio/visual endpoint is coupled with a first content source of the classroom, the first audio/visual endpoint configured to receive a first audio/visual data stream from the first content source. The second audio/visual endpoint is coupled with a public announcement (PA) system of the classroom, the second audio/visual endpoint configured to receive a second audio/visual data stream from the PA system. The speaker outputs audio data associated with the first audio/visual data stream or the second audio/visual data stream into the classroom. The screen displays text or images associated with the first audio/visual data stream or the second audio/visual data stream into the classroom.

The screen may be configured to output a text representation of the audio data output from the speaker. The audio/visual integration device may also include a microphone to receive voice commands from users positioned in the classroom. The audio/visual integration device may include a camera to capture visual data of the classroom. The speaker may be configured to output an auditory alert in response to receiving an alert signal, and the screen may be configured to output a visual alert in response to receiving the alert signal. The screen may be configured to display a time of day, a date, a weather report, a timer, or a combination thereof.

A further aspect of the present disclosure relates to a system that includes a stationary device positioned in a classroom and communicatively coupled with one or more devices for inputting or outputting multimedia content relative to the classroom. The stationary device is configured to: receive, from a device, a first signal indicating a volume control level of an audio output device, and transmit, to the audio output device, a second signal indicating the volume control level received from the device. The audio output device is positioned in the classroom and communicatively coupled with the stationary device. The audio output device is configured to: receive, from the stationary device, the second signal indicating the volume control level, and output, to a user of the audio output device, audio data at an output volume indicated by the volume control level.

The stationary device may be configured to receive, from the device, a third signal indicating a source of the audio data output by the audio output device, wherein the audio output device is positioned in the classroom and communicatively coupled with the stationary device. The audio output device may be configured to receive, from the stationary device, the third signal indicating the source of the audio data, and output, to the user of the audio output device, the audio data from the source indicated by the third signal. The audio output device may further be configured to: receive, from an input component of the audio output device, a second volume control level different than the volume control level, determine a relative priority of the volume control level and the second volume control level based at least in part on a source of each volume control level, and select the volume control level or the second volume control level as the output volume based at least in part on determining the relative priority. The audio output device may further be configured to determine an upper limit of the output volume based at least in part on the volume control level received from the stationary device. The audio output device may further be configured to determine a lower limit of the output volume based at least in part on the volume control level received from the stationary device. The second signal may be communicated using Digital Enhanced Cordless Telecommunications (DECT) protocols.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
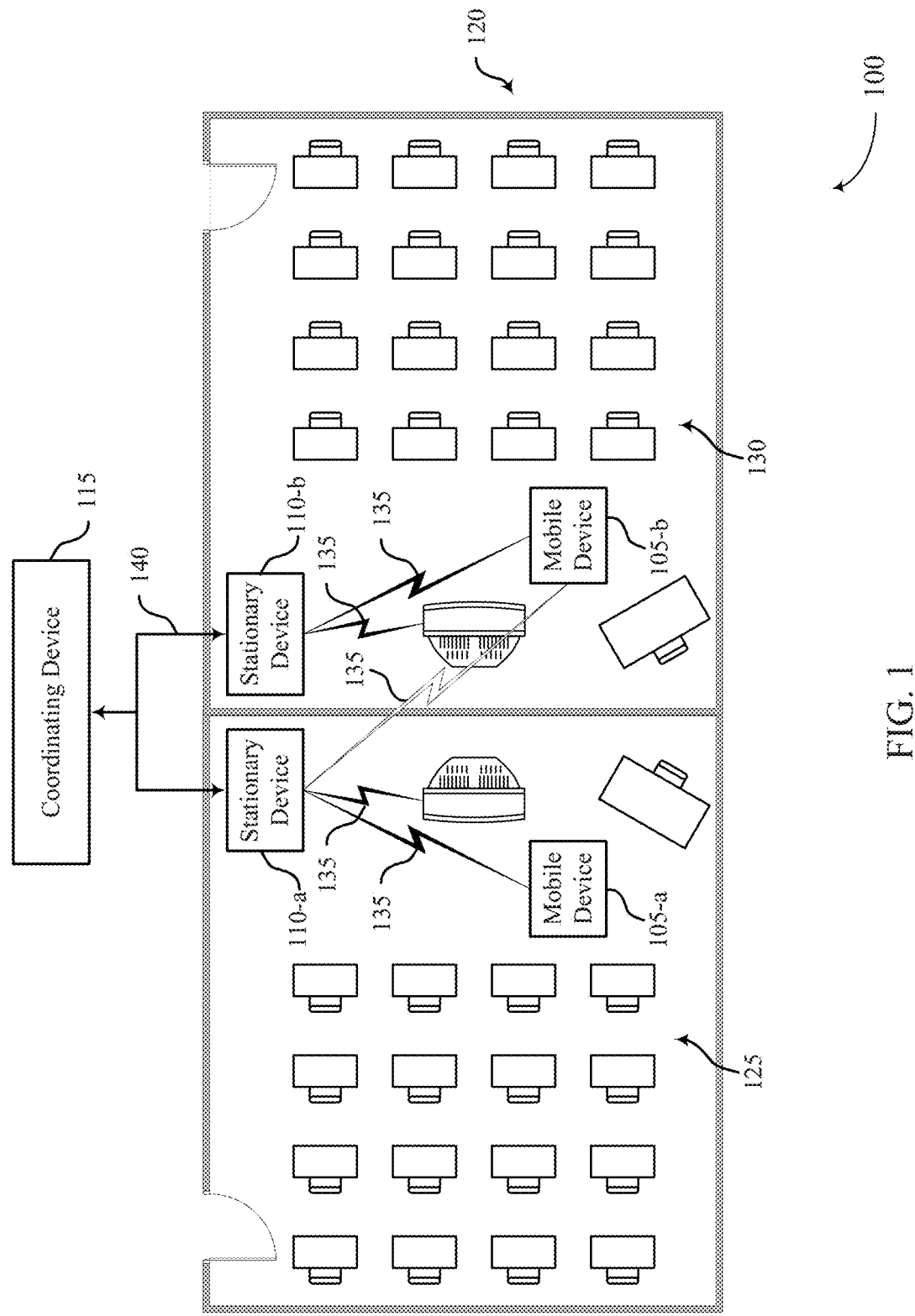
FIG. 1 illustrates a wireless communication system that supports a classroom audio visual device with central control, assistive listening, or a screen.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Assistive listening systems are systems that may include one or more assistive listening devices that bring sound directly to an ear of the listener. People show varying degrees of hearing at varying frequencies in both ears. Sometimes to account for the variability in hearing, it may be beneficial to provide customizable sound to individual listeners or individual areas in a room. In this manner, people may be able to hear and understand a presentation without making it too loud or soft for others listening to the same presentation.

Some environments, such as a classroom, may include legacy assistive listening systems. It may be advantageous to coordinate assistive listening functions between a legacy assistive listening system and other audio output devices. In such cases, the audio output devices and/or a stationary device may be used in conjunction with a legacy assistive listening system. The audio output devices and/or the stationary device may be configured to communicate one or more settings for one or more control parameters of the audio output devices. The stationary device may provide centralized control of at least some control parameters of the audio output devices. The stationary device may include a screen or display to output visual data in addition to audio data.

The present disclosure provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

FIG. 1 illustrates a wireless communication system 100 that supports a classroom audio visual device with central control, assistive listening, or a screen. The wireless communication system 100 may include one or more mobile devices 105, one or more stationary device 110, or one or more coordinating devices 115, or a combination thereof.

The wireless communication system 100 may be configured to integrate and coordinate the activities of a plurality of media devices at a location of a premises. For example, one or more wireless communication systems 100 may be deployed in a building that includes a plurality of rooms, and each room may include a plurality of media devices such as televisions, intercoms, speakers, microphones, projectors, computers, laptops, tablets, other devices, or a combination thereof. It may be desirable to integrate the control and communications between different devices in a single room such that the outputs (e.g., video streams or audio streams) of some devices may be coordinated. In some environments, however, the devices and/or rooms may be densely packed such that communications between devices in a first room or first location may interfere with communications between devices in a second room or second location.

An example of such an environment may be a school that includes a plurality of classrooms and other rooms. An instructor may wish to present multimedia presentations to one or more classrooms or to a segment of the classroom. The wireless communication system 100 may be configured to integrate different multimedia inputs into output streams that may be selectively sent to certain devices. In this manner, the instructor may have added control of media presented in the classroom and media presented as part of multi-classroom presentations. Other examples of such environments may include office spaces, factories, residences, or any building.

The wireless communication system 100 may include one or more mobile devices 105, one or more stationary device 110, or one or more coordinating devices 115, or a combination thereof. The wireless communication system 100 may be deployed at a premises 120 (e.g., a school) that includes one or more areas 125, 130 (e.g., classrooms). Each area 125, 130 may include one or more input/output devices. Examples of input/output devices may include televisions, monitors, projectors, personal computers, desktop computers, tablets, other electronic devices, speakers, microphones, touchscreens, keyboards, mice, buttons, microphone, assistive-listening devices, or a combination thereof.

The mobile devices 105 may be examples of input/output devices that communicate with other input/output devices via communication links 135 of one or more wireless access technologies. For example, a mobile device 105 may be a microphone, tablet, assistive listening endpoint, or other device. The mobile device 105 may be configured to communicate with the other input/output devices via an intermediary, such as the stationary device 110 and/or the coordinating device 115, or directly with the other devices, as the case may be. Examples of the wireless access technologies that may be used to communicate signals may include Digital Enhanced Cordless Telecommunications (DECT), cellular radio access technologies (e.g., 3G, 4G, 5G), Wi-Fi (e.g., RATs associated with IEEE 802.11 standards), BLUETOOTH®, or a combination thereof. The mobile device 105 may be an example of a portable part (PP) in a DECT network, a user equipment (UE) in a cellular network, a station in a Wi-Fi network, a device in a BLUETOOTH® network, or a combination thereof.

The stationary device 110 may coordinate communications between input/output devices in a given area (e.g., a first area 125). In some cases, the stationary device 110 may be an example of a classroom audio/visual device. The stationary device 110 may be an example of a fixed part (FP) in a DECT network, a base station or a UE in a cellular network, a station or an access point (AP) in a Wi-Fi network, a device in a BLUETOOTH® network, or a combination thereof. The stationary device 110 may also provide a low-latency connection between content sources or input devices and output devices. Some integration devices introduce latency into multimedia presentation through their processing of input data streams. For example, an instructor may use a computer and a television to present a video to a group. An integration device may cause a time delay or mismatch between the output of the computer and the output of television. Such a time delay may cause problems with the presentation. In other examples, time delays in multi-classroom presentations may cause audible echoes or difficulty communicating between classrooms. As such, a stationary device 110 that provides low-latency processing may mitigate some of these issues. In some cases, there is at least one stationary device 110 for each area of control/integration (e.g., a classroom) at a premises.

The coordinating device 115 may be an example of a server, computing device, or stationary device 110 that is configured to coordinate the communications between different areas of the premises and/or communications between different stationary devices 110 at the premises. The coordinating device 115 may be positioned at the premises or may be remote from the premises (e.g., positioned at a location that is not on the premises). The coordinating device 115 may communicate with the stationary devices 110 via communication links 140 using one or more wireless access technologies or one or more wired access technologies. For example, the coordinating device 115 may communicate with the stationary devices 110 using ethernet, DECT, cellular radio access technologies (e.g., 3G, 4G, 5G), Wi-Fi (e.g., RATs associated with IEEE 802.11 standards), BLUETOOTH®, or a combination thereof.

Some environments may include legacy assistive listening systems. It may be advantageous to coordinate assistive listening functions between a legacy assistive listening system and other mobile device 105. In such cases, the mobile devices 105 and/or a stationary device 110 may be used in conjunction with a legacy assistive listening system. The mobile devices 105 and/or the stationary device 110 may be configured to communicate settings for control parameters of the mobile devices 105. In such a manner, the stationary device 110 may provide centralized control of some control parameters of the mobile devices 105. The stationary device 110 may include a screen or display to output visual data in addition to audio data.

Figure 2:
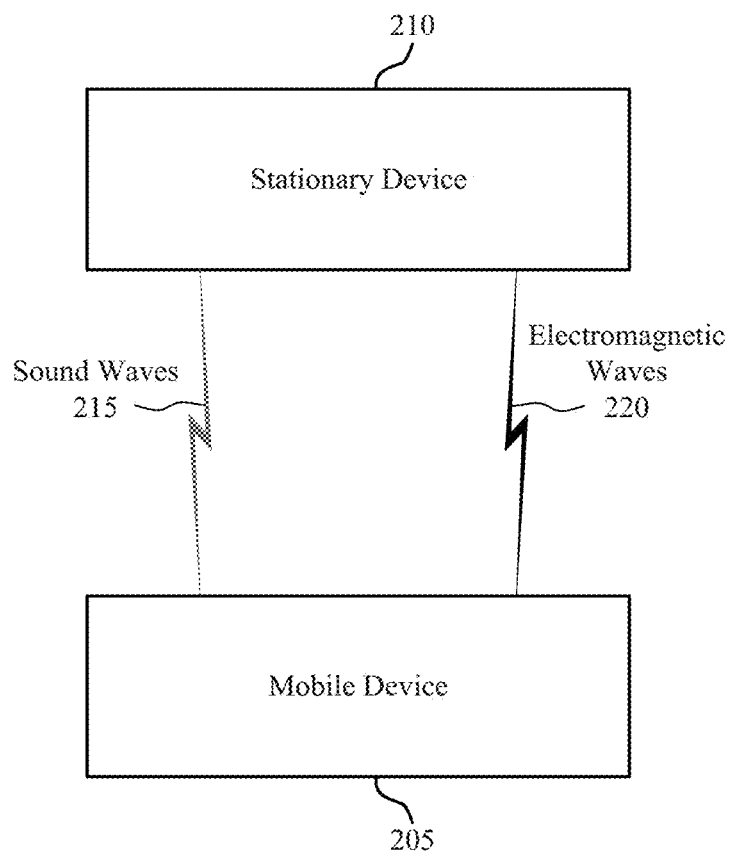
FIG. 2 illustrates a wireless communication system that supports a classroom audio visual device with central control, assistive listening, or a screen.

FIG. 2 illustrates a wireless communication system 200 that supports a classroom audio visual device with central control, assistive listening, or a screen (also referred to as a display). The wireless communication system 200 includes a mobile device 205 and a stationary device 210. The wireless communication system 200 may be an example of the wireless communication system 100 as described with reference to FIG. 1. The mobile device 205 may be an example of the mobile devices 105 described with reference to FIG. 1. The stationary device 210 may be an example of the stationary devices 110 described with reference to FIG. 1.

The mobile device 205 and the stationary device 210 may be configured to exchange information using both sound waves 215 (e.g., high-frequency audio signals) and electromagnetic waves 220 (e.g., radio frequency signals). The sound waves 215 may be configured to carry information that establishes communication links (e.g., communication links 135) of at least one wireless access technology (e.g., DECT), maintains the communication links of the at least one wireless access technology, and/or communicates emergency signals. The electromagnetic waves 220 may be examples of waves that carry information modulated using at least one wireless access technology (e.g., DECT). The electromagnetic waves 220 may be the carrier waves that are communicated as part of a wireless communication link 135 established between the mobile device 205 and the stationary device 210.

Both the sound waves 215 and the electromagnetic waves 220 may be physical manifestations of vibrations. The sound waves 215 may be examples of energy traveling through a medium, such as a gas, liquid, or solid. The sound waves 215 travel through the medium by causing molecules of the medium to bump against one another. The sound waves 215 may be examples of longitudinal waves that oscillate in the same direction as the travel of the wave. Electromagnetic waves 220 may be examples of transverse waves that oscillate orthogonally to the direction of travel of the wave. Electromagnetic waves 220 can travel through a vacuum and, thus, do not need a medium to travel through space.

The sound waves 215 and electromagnetic waves 220 may operate in the same frequency ranges or in different frequency ranges. Because the waves themselves are different, sound waves 215 and electromagnetic waves 220 may not interfere with each other, even when operating at or near the same frequency.

Many devices use electromagnetic waves 220 to wirelessly communicate with each other. In fact, many, if not most, wireless communication systems rely on electromagnetic waves 220 to act as carriers for modulated data. Depending on the frequencies of the electromagnetic waves 220, many waves can penetrate and travel through solid objects. In many situations, this provides many advantages. For example, a phone in a building is able to maintain a communication link with base stations outside of the building and/or Wi-Fi deployments cover more than one room in a building.

In dense environments where many electronic devices are present and trying to communicate using electromagnetic waves 220, the frequency spectrum band for communicating signals can get crowded. Further, different devices may interfere with one another or may inadvertently be paired with one another. For example, a mobile device 205 in a first room may pair with a stationary device 210 in a second room causing problems for both rooms.

In such dense environments, sound waves 215 may have the advantage of being impeded or attenuated by some physical objects. For example, high-frequency sound waves may be heavily attenuated by walls or other structures. As such, sound waves may be used to control devices, pair devices in wireless access technology, and/or maintain pairings between devices in the wireless access technology to reduce the amount of interference and/or inadvertent pairings between devices.

Figure 3:
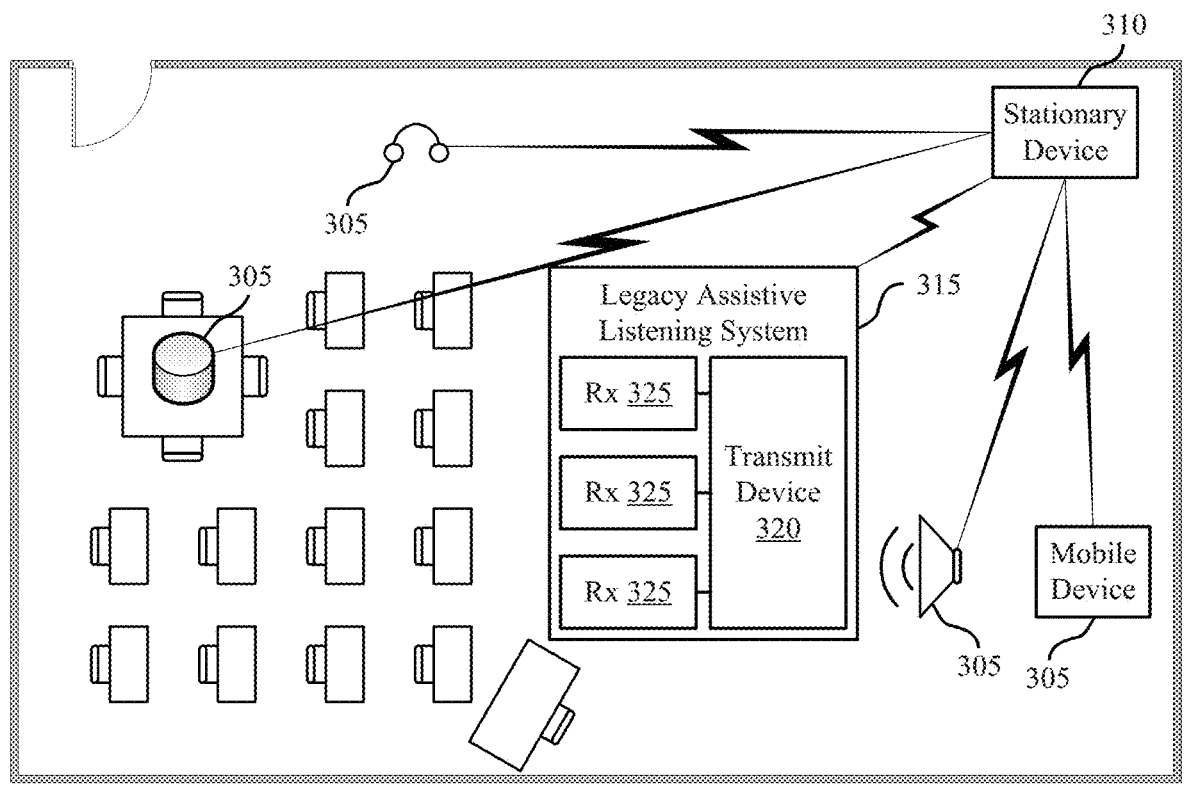
FIG. 3 illustrates an assistive listening system that supports a classroom audio visual device with central control, assistive listening, or a screen.

FIG. 3 illustrates an assistive listening system 300 that supports a classroom audio visual device with central control, assistive listening, or a screen. The assistive listening system 300 may include one or more mobile devices 305, one or more stationary device 310, and/or one or more legacy assistive listening systems 315. The mobile device 305 may be an example of the mobile devices 105 and 205 described with reference to FIGS. 1 and 2. The stationary device 310 may be an example of stationary devices 110 and 210 described with reference to FIGS. 1 and 2. The assistive listening system 300 may implement aspects of the wireless communication systems 100 and 200 described with reference to FIGS. 1 and 2.

Assistive listening systems generally are systems that may include at least one transmitter and one or more receivers (e.g., assistive listening devices) that bring sound directly to the listener (e.g., directly to the ear of the listener). People show varying degrees of hearing at varying frequencies in both ears. Sometimes to account for the variability in hearing, it may be beneficial to provide customizable sound to individual listeners or individual areas in a room. In this manner, people may be able to hear and understand a presentation without making it too loud or soft for others listening to the same presentation.

The assistive listening system 300 may include a stationary device 310, which may serve as an integration device and/or a central managing device of the assistive listening system 300. The stationary device 310 may receive audio information to be output through the assistive listening system 300 from a variety of sources. Examples of the sources of audio information that may be received by the stationary device 310 may include a public announcement system, a microphone, a television, a computer, a tablet, a smart phone, or other multimedia device, or a combination thereof.

The stationary device 310 may be configured to transmit one or more assistive listening audio streams to one or more mobile devices 305 and/or the legacy assistive listening system 315. The one or more mobile device 305 may be examples of assistive listening devices or audio output devices. Examples of audio output devices may include headphones, speakers, cochlear implants, voice-controlled speakers, smart speakers, or a combination thereof.

Some premises, such as schools or classrooms, may include assistive listening systems, such as the legacy assistive listening system 315 that may be used to provide assistive listening to a room or area. The assistive listening system 300 may be implemented sometime after the legacy assistive listening system 315 is implemented. The term legacy may refer to an old method, technology, computer system, or application program relating to, or being a part of previous computer system. The assistive listening system 300 may be part of an integrated audio/visual system for a premises, room, classroom, or area. In some cases, it may be desirable for the assistive listening system 300 to cooperate and communicatively couple with the legacy assistive listening system 315. In such cases, the assistive listening system 300 may expand the reach of and/or provide additional features and functionality relative to the legacy assistive listening system 315, without totally replacing the legacy assistive listening system 315. The assistive listening system 300 may be independent of the legacy assistive listening system 315 such that the assistive listening system 300 may be configured to provide assistive listening content through mobile devices 305, through the legacy assistive listening system 315, or combinations thereof.

The legacy assistive listening system 315 may include at least one transmitter 320 and one or more receivers 325. The transmitter 320 may be an example of base station that receives audio content and broadcasts the audio content to the one or more receivers 325. The transmitter 320 may be an example of a computing device. In some cases, the transmitters 320 may be configured to amplifier the audio content signal.

The one or more receivers 325 may be configured to output the audio content received from the transmitter 320 to a user of the receiver 325. The one or more receivers 325 may be examples of a mobile devices 305, assistive listening devices, and/or audio output devices.

The stationary device 310 may serve an area of a premises, such as a room. In some cases, the entire area served by the stationary device 310 may be participating in the same presentation. In such cases, the stationary device 310 may transmit the same audio stream to every mobile device 305 that is acting as an assistive listening device and/or the legacy assistive listening system 315. For example, the stationary device 310 may transmit the audio stream to the transmitter 320 of the legacy assistive listening system 315, which may transmit the audio stream to one or more receivers 325 of the legacy assistive listening system 315.

In some cases, the type of communication link between the stationary device 310 and the transmitter 320 may be different than the type of communication link between the transmitter 320 and the receivers 325 of the legacy assistive listening system 315. The communication link between the stationary device 310 and the transmitter 320 may be a wired link (e.g., Ethernet, RS-232, USB, HDMI, or other) or a wireless link (e.g., DECT, Bluetooth, Wi-Fi, or other). The communication link between the transmitter 320 and the one or more receivers 325 may be a wired link (e.g., Ethernet, RS-232, USB, HDMI, or other) or a wireless link (e.g., DECT, Bluetooth, Wi-Fi, or other).

In some cases, the stationary device 310 may communicate with the transmitter 320 using a first radio access technology and the transmitter 320 may communicate with the one or more receivers 325 using a second radio access technology different than the first radio access technology. For example, the first radio access technology may be an example of DECT and the second radio access technology may be an example of 72 MHz system or a 216 MHz system. In such cases, a mobile device 305 may receive the audio content from the stationary device 310 over the first radio access technology, while the receivers 325 receive the audio content from the transmitter 320 over the second radio access technology.

In some cases, the stationary device 310 may determine which mobile devices 305 and/or whether the legacy assistive listening system 315 are involved with outputting a presentation over a duration. In such cases, the stationary device 310 may receive audio content from at least one source of multimedia content associated with an area (e.g., a classroom). The stationary device 310 may identify that the audio content is part of a presentation that includes assistive listening. For example, the stationary device 310 may determine that one or more assistive listening devices are activated and transmit the audio content to the various devices. The stationary device 310 may transmit the audio content to the identified mobile devices 305 and/or the legacy assistive listening system 315. In some cases, the stationary device 310 may use one or more mobile devices 305 or the legacy assistive listening system 315 to output a single presentation over a duration.

In some cases, the stationary device 310 may use one or more mobile devices 305 and the legacy assistive listening system 315 to output a single presentation over a duration. In such cases, the stationary device 310 may identify an audio output delay associated with each mobile device 305 and/or each receiver 325 configured to output the presentation. The stationary device 310 may identify an audio stream offset for each device or class of device to coordinate the output the audio content to the users. In such a manner, the stationary device 310 may be configured to mitigate or reduce echoes or offsets that users may hear when audio content output by multiple devices is detectable by a single user. In some cases, the stationary device 310 may transmit the audio content at different times based on the audio stream offsets to cause the output to the users to be coordinated. In some cases, the mobile devices 305 and/or the legacy assistive listening system 315 may be configured to buffer the inputs received and output the audio data at a coordinated time indicated by the stationary device 310.

In some cases, different regions of the area or different individuals in the area may be participating in different presentations. In such cases, the stationary device 310 may be configured to transmit different audio streams to different mobile devices 305 that are acting as assistive listening devices and/or the legacy assistive listening system 315. The stationary device 310 may identify which mobile devices 305 are to receive which presentation and/or which presentation is to be sent to the legacy assistive listening system 315. The stationary device 310 may determine that any set of mobile devices (or lack thereof) may be combined with the legacy assistive listening system 315 to output a single presentation.

The assistive listening system 300 may use sound waves to pair the mobile devices 305 with the stationary devices 310. When the devices are paired, a communication link using electromagnetic waves is established using a wireless access technology such as DECT.

In some cases, the stationary device 310 may be configured to control the output volume of the audio information at the mobile devices 305 and/or the legacy assistive listening system 315. In this manner, a person may have centralized control over multiple assistive listening devices in the area and can manage the volume levels to minimize interference. For example, a first speaker may be outputting a first audio stream into a first region of a room and a second speaker may be outputting a second audio stream into a second region of the room, and the stationary device 310 may be configured to control the volume of each speaker.

In some cases, the stationary device 310 may integrated as part of a display, projector, or a TV monitor (e.g., a screen). In such cases, the stationary device 310 may provide the multimedia content passing through or being output by the display, projector or TV monitor is communicated to an audio output device (e.g., whether a mobile device 305 or a receiver 325 of a legacy assistive system 315). In such cases, the audio data may not pass through a separate stand-alone device between the multimedia content source and the mobile devices 305 and/or the legacy assistive listening system 315. In some cases, the stationary device 310 may be configured as a device that plugs into a port (e.g., a USB port) of an existing display, projector or TV monitor. In some cases, the stationary device 310 may be integrated into the interior of the housing of the display, projector or TV monitor.

Figure 4:
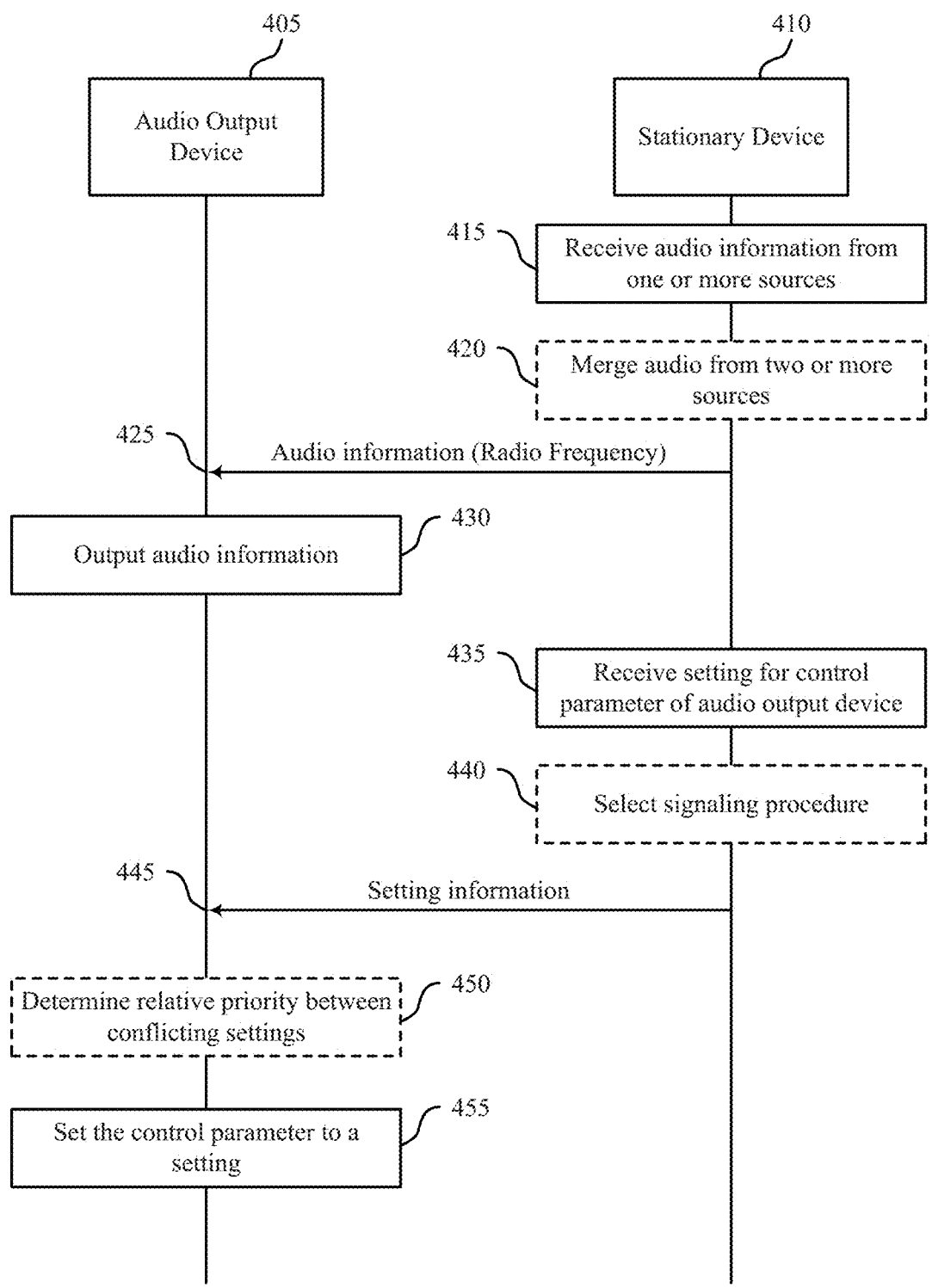
FIG. 4 illustrates a process flow that supports a classroom audio visual device with central control, assistive listening, or a screen.

FIG. 4 illustrates a process flow 400 that supports a classroom audio visual device with central control, assistive listening, or a screen. The process flow 400 may be for controlling centrally one or more settings of an assistive listening device. The process flow 400 illustrates procedures and/or communications between an audio output device 405 with a stationary device 410 in a wireless access technology. The audio output device 405 may be an example of the mobile devices 105, 205, and 305 described with reference to FIGS. 1-3 or an example of a receiver 325 in a legacy assistive listening system 315 described with reference to FIG. 3. The stationary device 310 may be an example of stationary devices 110, 210, and 310 described with reference to FIGS. 1-3.

At block 415, the stationary device 410 may receive audio information from one or more sources of audio information. Examples of the sources of audio information that may be received by the stationary device 410 may include a public announcement system, a microphone, a television, a computer, a tablet, a smart phone, DVD player, video home system (VHS) player, cassette player, compact disc (CD) player, or other multimedia device, or a combination thereof. The stationary device 410 may receive the audio information using wired communication links (e.g., ethernet or RS-232), wireless communication links (e.g., DECT, BLUETOOTH®, etc.), or a combination thereof. The sources of audio information may be positioned in the area served by the stationary device 410. In some cases, some sources of audio information may be positioned outside of the area served by the stationary device 410.

In some cases, at block 420, the stationary device 410 may be configured to integrate audio from multiple sources into a single set of assistive listening audio information. For example, the stationary device 410 may integrate audio information received from a television with audio information received from a microphone. In this manner, the assistive listening system may be configured to capture all of the audio from a presentation that includes multiple sources of audio.

The stationary device 410 may transmit audio information 425 to one or more audio output devices 405 acting as assistive listening devices. The audio information 425 may be communicated over electromagnetic waves using a wireless access technology such as DECT. The audio information 425 may be communicated using wired communication links (e.g., ethernet or RS-232), wireless communication links (e.g., DECT, BLUETOOTH®, etc.), or a combination thereof.

At block 430, the audio output device 405 may be configured to output the audio information to the listeners associated with the audio information. The audio information may be output through a speaker integrated into a variety of different types of audio output device 405.

At block 435, the stationary device 410 may receive a setting for a control parameter of the audio output device 405. The setting may be received from a computing device associated with a presenter or with some other authority figure in the area (e.g., a teacher in a classroom). The setting may be an example of limitation to apply to local settings (e.g., a volume minimum or a volume maximum) or a setting that overrides the local setting of the audio output device 405 (e.g., a volume setting level or an audio source input setting).

In some cases, at block 440, the stationary device 410 may optionally select a signaling procedure to communicate the setting to the audio output device 405. The stationary device 410 may determine a priority of the setting or determine a type of the setting. Different settings may be communicated differently. In some examples, the stationary device 410 may transmit the setting over a wireless access technology, such as DECT. In some examples, the stationary device 410 may transmit the setting over access technologies that use sound waves, such as those described with reference to FIG. 2.

The stationary device 410 may transmit the setting information 445 to the audio output device 405 over the selected technology or medium. In some cases, the setting information 445 may include specific information about the type of setting, the priority of the setting, the priority of the setting as compared with local settings, a flag indicating whether this setting overrides local settings, a type of the setting, a value of the setting, or a combination thereof.

At block 455, the audio output device 405 may set the control parameter to the setting indicated by the setting information 445. The audio output device 405 may disable local control over the setting for a duration based on receiving the setting information.

In some cases, such as at block 450, the audio output device 405 may determine a relative priority between conflicting settings before setting the control parameter to the setting indicated in the setting information 445. In some implementations, the setting information 445 received from the stationary device 410 may conflict with the setting indicated by a local input component of the audio output device 405. In such implementations, the audio output device 405 may perform one or more conflict resolution procedures.

The audio output device 405 may receive a setting from an input component of the audio output device 405. Examples of the input component may include buttons on the audio output device 405, a microphone and processor to process voice commands, a network component to receive settings from a second computing device, or a combination thereof. The input component may be configured to receive settings from a wearer or user of the audio output device 405, whereas, in contrast, the setting information 445 may originate from a presenter or some entity that is not the direct wearer of the audio output device 405.

The audio output device 405 may determine a relative priority of a first setting received from the input component (e.g., received from the wearer of the audio output device 405) and a second setting received from the stationary device 410 (e.g., received from another entity). In some cases, the audio output device 405 may determine the priority of each received individually and then compare the priorities. In some cases, the audio output device 405 may identify a source of the setting and the relative priority may be based on the source of the setting. For example, settings received from the stationary device 410 may be a higher priority than settings received from the input component.

The control parameter associated with the settings (e.g., the first setting and/or the second setting) may be a volume control of the audio output device. In such cases, the settings may be examples of volume control levels. If the input component outputs a first volume control level and the setting information 445 indicates a second volume control level different than the first volume control level, the audio output device 405 may use conflict resolution procedures to determine which volume control level to use. For example, the audio output device 405 may determine that the second volume control level received in the setting information 445 has a higher priority than the first volume control level and set the volume control of the audio output device 405 to the second volume control level based on that relative priority.

In some cases, the setting information 445 may indicate lower limits or upper limits or both for a control parameter for the audio output device 405. In such cases, the input component may be configured to adjust the control parameter of the audio output device 405 within the parameters specified by the upper limit or the lower limit. For example, the setting information 445 may include an upper limit for volume control (e.g., a maximum volume) to prevent the audio output device 405 from outputting a volume level that disturbs others in the area. In other examples, the setting information may include a lower limit for volume control (e.g., a minimum volume to prevent the audio output device 405 from being muted or set so low that it cannot be heard). In some examples, the setting information 445 may indicate a combination of upper limits and lower limits. In such examples, the audio output device 405 may be configured to set the control parameter to the setting level indicated input component, when that setting level is within the upper limit or lower limit. When the setting from the input component exceeds the upper limit or the lower limit, the audio output device 405 may be configured to set the control parameter to the respective limit (e.g., the upper or lower limit). In some examples, the setting information 445 may indicate an exact setting to be followed. In such examples, the audio output device 405 may ignore or disable settings from the input component.

In some cases, the audio output device 405 may be configured to prioritize the setting receiving in the setting information 445 for a duration. The audio output device 405 may initiate a timer or a clock when the setting information 445 is received. The audio output device 405 may determine when the timer or clock satisfies a duration threshold. Once the threshold is satisfied, the audio output device 405 may cease using the restrictions to the setting of the control parameter imposed by the setting information 445. In such cases, the audio output device 405 may set the setting for the control parameter to the setting received from the input component.

The control parameter associated with the settings (e.g., the first setting and/or the second setting) may be an audio input source of the audio output device 405. In such cases, the settings may be examples of audio input sources. If the input component outputs a first audio input source and the setting information 445 indicates a second audio input source different than the first audio input source, the audio output device 405 may use conflict resolution procedures to determine which audio input source to use. For example, the audio output device 405 may determine that the second audio input source received in the setting information 445 has a higher priority than the first audio input source and set the audio input source of the audio output device 405 to the second audio input source based on that relative priority.

Figure 5:
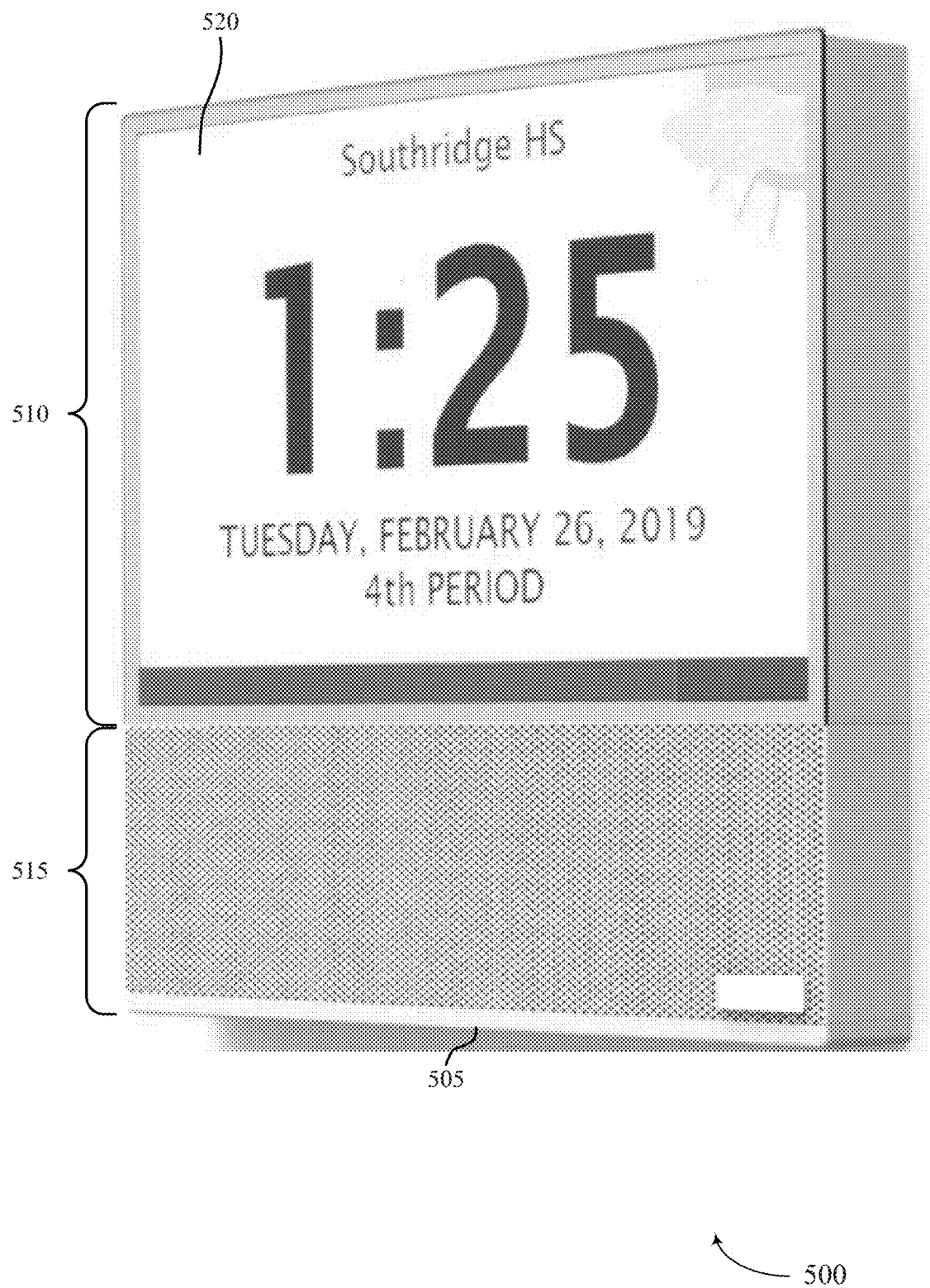
FIG. 5 illustrates a stationary device that supports central control, assistive listening, or a screen.

FIG. 5 illustrates a perspective view of a stationary device 500 that supports central control, assistive listening, and/or a screen. The stationary device 500 may be an example of the stationary devices 110, 210, 310, and 410 described with reference to FIGS. 1-4. The stationary device 500 may be configured to implement any of the functions or communication described with reference to FIGS. 1-4.

The stationary device 500 may include a screen 520 (also referred to as a display 520) configured to display text or images. In some cases, the stationary device 500 may be configured to replace a clock in an area or a classroom and/or a speaker system in the area or the classroom. For example, the stationary device 500 may include the endpoints described with reference to FIG. 7, a speaker described with reference to FIG. 7, and the screen 520. The stationary device 500 may include the components or functionality described with reference to FIGS. 6A, 6B, and 7.

The stationary device 500 may include a housing 505 that includes a first portion 510 and a second portion 515. The first portion 510 may include the screen 520. The second portion 515 may include other components and circuitry including one or more audio visual endpoints, a speaker, the screen 520, a microphone, or a camera, or a combination thereof. In some cases, at least portions of the other components and circuitry may be included in the first portion 510 or at least partially included in the first portion.

In some cases, the stationary device 500 may include a first audio/visual endpoint, a second audio/visual endpoint, a speaker, and the screen 520. The first audio/visual endpoint may be coupled with a first content source of an area (e.g., a classroom) and may be configured to receive a first audio/visual data stream from the first content source. The second audio/visual endpoint may be coupled with a public announcement (PA) system of the area (e.g., the classroom) and may be configured to receive a second audio/visual data stream from the PA system. The speaker may be configured to output audio data associated with the first audio/visual data stream or the second audio/visual data stream into the area (e.g., the classroom). The screen 520 may be configured to display text or images associated with the first audio/visual data stream or the second audio/visual data stream into the area (e.g., the classroom). The screen 520 may be configured to output a text representation of the audio data output from the speaker.

The stationary device 500 may also include a microphone configured to receive voice commands from users positioned in the area (e.g., the classroom). For example, the stationary device 500 may receive audio input from the microphone. To distinguish voice commands from other noise, the stationary device 500 may monitor for and/or identify an activate phrase. An example of an activate phrase may be "Hey Siri" or "Hey Alexa." After the stationary device 500 identifying the activate phrase, the stationary device 500 may identify one or more voice commands included in a duration after the activate phrase. The stationary device 500 executes the one or more identified voice commands.

The stationary device 500 may also include a camera configured to capture visual data from the area (e.g., the classroom). The camera may be configured to capture the visual data from the area in response to a command or a voice command from the area (e.g., the classroom). For example, the camera may capture the visual data to send a video message or a picture to another stationary device. In another example, the camera may capture the visual data as part of recording or transmitting a presentation in the area to another area. In another example, the camera may capture the visual data in response to an alert signal or a paging signal being sent from the area (e.g., the classroom). The camera may be configured to capture the visual data in response to a command from a remote location (e.g., a coordinating device). The same examples for capturing visual data in response to a local command may apply to examples where a command is received from a remote location.

The stationary device 500 may be configured to use the screen 520 as part of an alert system. In many areas, auditory alerts (such as fire alarms) are used to alert people. In some examples, flashing lights and/or other visual alerts may be used. The screen 520 may be configured to output visual alerts related to receiving an alert signal. Examples of the visual alerts may include flashing lights, an indication of what type of alert has been issued (e.g., fire alarm, active shooter alarm, earthquake alarm, lockdown alarm, end of period alarm, or others), instructions about what to do next (e.g., a map to exit the building), other visual alerts, or combinations thereof. The speaker may be configured to output an auditory alert signal in conjunction with outputting the visual alert from the screen 520.

The screen 520 may be configured to output text or images associated with auditory streams. For example, if an announcement is being made over a PA system, the stationary device 500 may be configured to display text that represents the audio data being output by the speaker. In effect, the screen 520 may act as a closed-captioning system for PA announcements or other audio. This may assist hearing impaired people in the area (e.g., the classroom).

The screen 520 may be configured to output other data related to the area (e.g., the classroom). Examples of the other data may include the time of day, a date, a weather report associated with the area, a timer, a stopwatch, or a combination thereof. For example, a person in the room may set a timer for an activity (e.g., a test) and the timer may be displayed on the screen 520.

In some buildings, such as schools, PA systems and clocks may already be installed in rooms and other areas. The stationary device 500 may be configured as a replacement of the PA speaker and the clock that already exists in the schools. In this manner, installing the stationary device 500 may be easier because it leverages the wiring already going to those legacy systems (e.g., PA speaker and/or the clock).

Figure 6A:
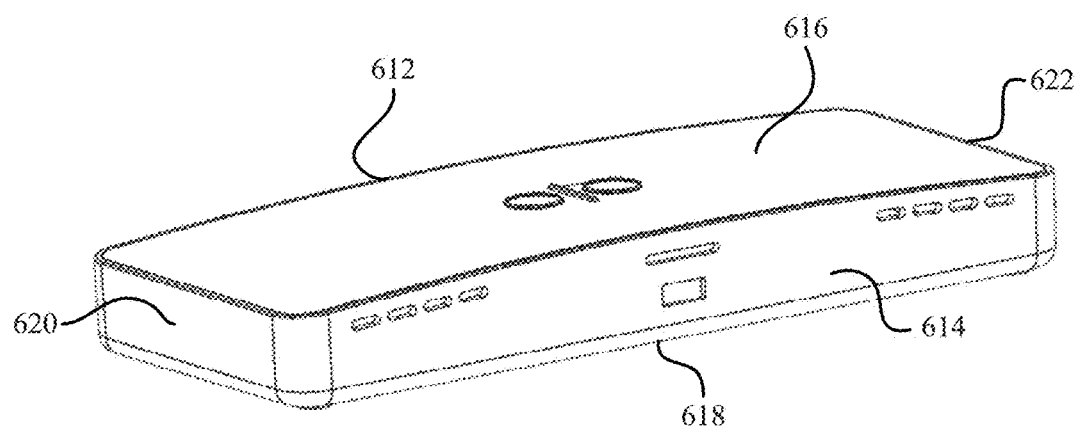
FIGS. 6A and 6B illustrate a stationary device that supports central control, assistive listening, or a screen.

FIG. 6A illustrates a perspective view of a stationary device 600-*a* that supports central control, assistive listening, or a screen. The stationary device 600-*a* may be an example of the stationary devices 110, 210, 310, 410, and 500 described with reference to FIGS. 1-5. The stationary device 500 may be configured to implement any of the functions or communication described with reference to FIGS. 1-5.

The stationary device 600-*a* includes a back wall 612, a front wall 614 positioned opposite the back wall 612, a top wall 616, a bottom wall 618 positioned opposite the top wall 616, and two side walls 620, 622 positioned opposite one another. The walls 612, 614, 616, 618 may define a housing for the stationary device 600-*a*, and the housing may have a hollow interior to retain a plurality of components. The stationary device 600-*a* may include a plurality of ports 624 (shown in FIG. 6B) positioned in the back wall 612 or positioned at other locations on the housing. In some examples, the stationary device 600-*a* may include circuitry to communicate via one of a plurality of wireless radio access technologies (RATs). For example, the stationary device 600-*a* may include antennas and other circuitry to communicate using cellular RATs (e.g., 3G, 4G, 5G), Wi-Fi (e.g., RATs associated with IEEE 802.11 standards), BLUETOOTH®, DECT, or a combination thereof.

The stationary device 600-*a* may also include an infrared (IR) receiver (not shown). The IR transceiver may be configured to detect signals transmitted using the infrared frequency spectrum band. The IR transceiver may be positioned adjacent to the front wall 614 of the stationary device 600-*a*. In some examples, the front wall 614 may include an aperture (not shown) through which the IR transceiver may protrude.

In some examples, the stationary device 600-*a* may include an ultrasonic transceiver (not shown). The ultrasonic transceiver may be configured to transmit or receive signals over sound waves in the frequency range above that which is detectible by the human ear. The ultrasonic frequency spectrum band may refer to frequencies above the hearing range of some or all humans. In some examples, the ultrasonic frequency spectrum may be in the range between about 20 kHz and about 25 kHz. Many modern electronic devices include microphones and speakers that can communicate in the ultrasonic range to ensure that performance in the typical human hearing range is optimal. The stationary device 600-a may be configured to communicate with other devices (e.g., computers, smartphones, tablets, etc.) using ultrasonic signals. The ultrasonic transceiver may include a speaker and a microphone.

Figure 6B:
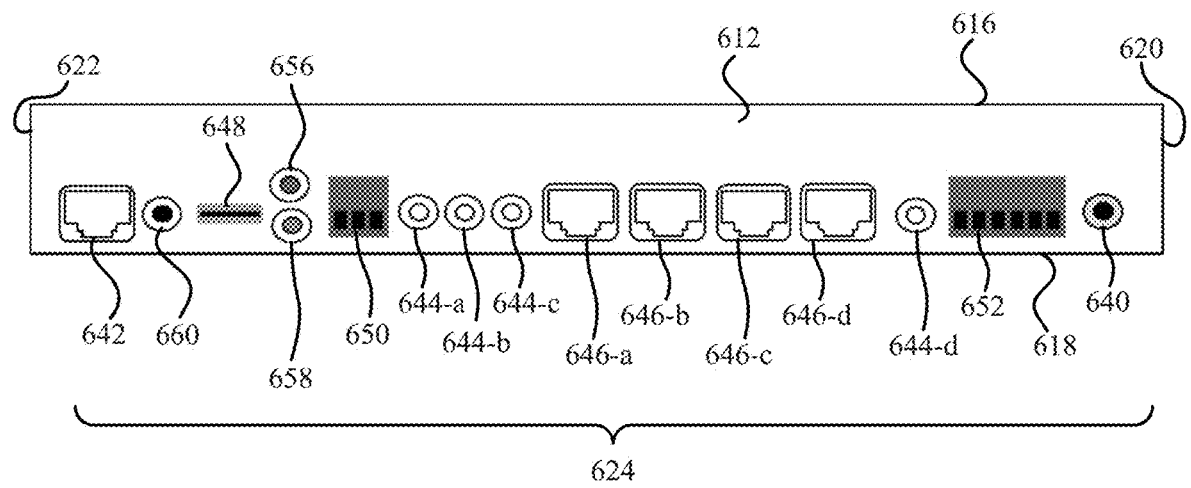

FIG. 6B illustrates an elevation view of the back wall 612 of a stationary device 600-b that supports central control, assistive listening, or a screen. The stationary device 600-b is another view of the stationary device 600-a described with reference to FIG. 6A.

The stationary device 600-b may include a plurality of ports 624 positioned in the back wall 612. The plurality of ports 624 may be configured to receive wired data connections of various types. In some examples, the plurality of ports 624 may be examples of female sockets for their respective port types. The plurality of ports 624 may include a power port, a high-definition multimedia interface (HDMI) port, an audio port, a serial port, a component audio/video port, multi-pin ports, other types of ports, or a combination thereof.

The ports of the stationary device 600-b may include a power port 640, an Ethernet port 642, a plurality of component ports 644-a, 644-b, 644-c, 644-d, a plurality of input/output (I/O) ethernet ports 646-a, 646-b, 646-c, 646-d, a USB port 648, a serial port 650, and a multi-pin port 652. In addition, the stationary device 600-b may include a number of input/output devices. For example, the stationary device 600-b may include a first indicator 656, a second indicator 658, and button 660. The functions of each of these components of the stationary device 600-b are described with more detail in FIG. 10.

The power port 640 may be adjacent to, for example, the one of the sidewalls 620. The Ethernet port 642 may be positioned next to, for example, a sidewall 622 different than the one adjacent to the power port 640. The Ethernet port 642 may be an example of an ethernet port configured to couple the stationary device 600-b with an external network. In some cases, the Ethernet port 642 is a POE port. The USB port 648 may be positioned near the ethernet port 642. The USB port 648 may be an example of a USB-c port.

The plurality of component ports 644 may be configured to receive or transmit data streams with an audio system or a visual system (e.g., an intercom system in a school, a telephone system in an emergency response situation). In some cases, at least one component port 644 may be an example of an auxiliary (AUX) port. In some cases, at least one component port 644 may be an example of a component audio video (CAV) port. In some cases, a first component port 644-a may be configured as an audio line input. In some cases, a second component port 644-b may be configured as an audio line input. In some cases, a third component port 644-c may be configured as an audio line input. In some cases, a fourth component port 644-d may be configured as an audio line output.

The plurality of I/O ethernet ports 646 may be configured to receive or transmit data streams with an audio system or a visual system (e.g., an intercom system in a school, a telephone system in an emergency response situation). In some cases, a first I/O ethernet port 646-a may be configured as an audio/visual line input with control. In some cases, a second I/O ethernet port 646-b may be configured as an audio/visual line input with control. In some cases, a third I/O ethernet port 646-c may be configured as an audio/visual line output with control. In some cases, a fourth I/O ethernet port 646-d may be configured as an input line for a microphone or may serve as a general purpose input output (GPIO).

The serial port 650 may be an example of an RS-232 port. The serial port 650 may be positioned between the USB port 648 and the plurality of component ports 644. The stationary device may be configured to merge a data streams received over any of the ports described herein.

The indicators 656, 658 may be examples of light emitting diodes (LEDs). The first indicator 656 may be a red LED configured to indicate when powered that the stationary device 600-b is not functioning properly. The second indicator 658 may be a green LED configured to indicate when powered that the stationary device 600-b is functioning properly. The button 660 may be a reset button configured to reset the stationary device 600-b based on the button being actuated.

The multi-pin port 654 may be positioned adjacent to one of the power port 640. The multi-pin port 654 may be configured to provide a speaker output or a page mute.

In some cases, the stationary device 600-b may include one or more HDMI ports that may be configured to receive and/or output data streams. Using the one or more HDMI ports, the stationary device 600-b may be installed in-line between a content source (e.g., computer) and an output device (e.g., TV or projector).

In some cases, at least some features of the stationary device 600 may be incorporated into the stationary device 500. For example, the stationary device 500 may include the endpoints and ports described herein. In some cases, the second portion 515 of the stationary device 500 may include aspects of the stationary device 600.

Figure 7:
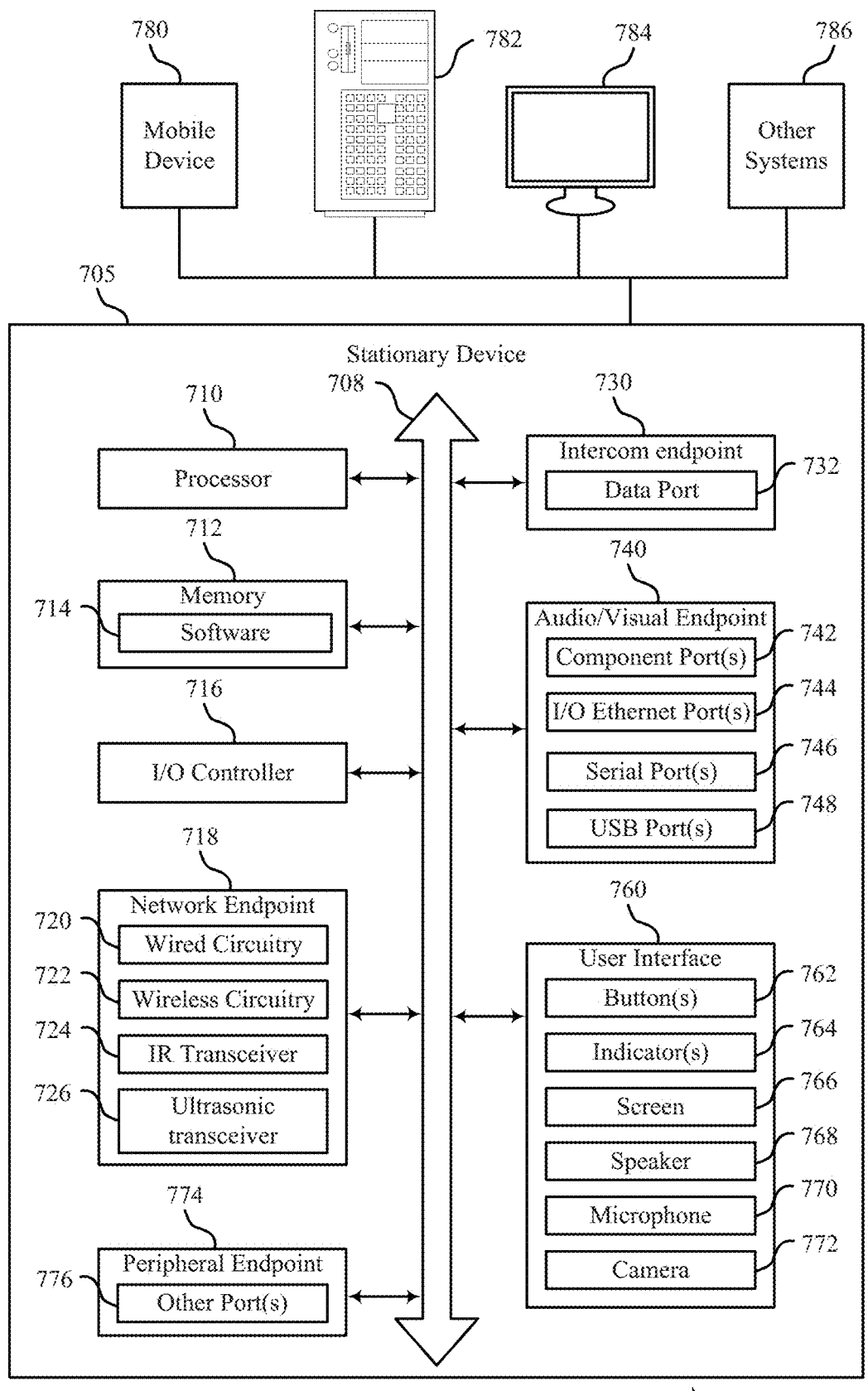
FIG. 7 illustrates a block diagram of a stationary device that supports central control, assistive listening, or a screen.

FIG. 7 illustrates a block diagram 700 of a stationary device 705 that supports central control, assistive listening, or a screen. The stationary device 705 may be an example of the stationary devices 110, 210, 310, 410, 500, 600 described with reference to FIGS. 1-6B. The stationary device 705 may be configured to implement any of the functions or communication described with reference to FIGS. 1-6B.

The stationary device 705 may include components for bi-directional voice and data communications including components for transmitting and receiving communications, including processor 710, memory 712, software 714, I/O controller 716, network endpoint 718, an intercom endpoint 730, and audio/visual endpoint 740, a user interface 760, and a peripheral endpoint 774. These components may be in electronic communication via one or more busses (e.g., bus 708).

In some cases, stationary device 705 may communicate with a content source (e.g., mobile device 780 or computing device 782), a remote storage device, a remote computing device 782, an audio/visual output device 784 (e.g., television, projector system, or monitor), and/or other system 786 (e.g., intercom system, audio system, I/O devices, telephone system). For example, one or more elements of the stationary device 705 may provide a direct connection to a remote computing device 782 via one or more of the endpoints described herein. In some embodiments, one element of the stationary device 705 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of the stationary device 705 (e.g., cameras, wireless remote, wall mounted user interface, battery, lighting system, and so on). In some embodiments, all of the elements shown in FIG. 7 need not be present to practice the present systems and methods. The devices and subsystems may also be interconnected in different ways from that shown in FIG. 7. In some embodiments, an aspect of the operations of the stationary device 705 may be readily known in the art and are not discussed in detail in this disclosure.

The signals associated with the stationary device 705 may include wireless communication signals such as radio frequency, electromagnetics, LAN, WAN, VPN, wireless network (using 802.11, for example), 345 MHz, Z-WAVE®, cellular network (using 3G and/or Long Term Evolution (LTE), for example), DECT, and/or other signals. The RAT of the stationary device 705 may be related to, but are not limited to, wireless wide area network (WWAN) (GSM, CDMA, and WCDMA), wireless local area network (WLAN) (including BLUETOOTH® and Wi-Fi), WiMAX, DECT, antennas for mobile communications, and antennas for Wireless Personal Area Network (WPAN) applications (including radio frequency identification devices (RFID) and UWB). In some embodiments, one or more sensors (e.g., IR, ultrasonic, motion, light, sound) may connect to some element of the stationary device 705 via a network using the one or more wired and/or wireless connections.

Processor 710 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). Processor 710 may be configured to execute computer-readable instructions stored in a memory to perform various functions. In some examples, the processor 710 may be referred to as an integrator.

Memory 712 may include random access memory (RAM) and read-only memory (ROM). The memory 712 may store computer-readable, computer-executable software 714 including instructions that, when executed, cause the processor to perform various functions described herein. In some cases, the memory 712 may store the software 714 associated with the stationary device 705. In some cases, the memory 712 may contain, among other things, a basic input/output system (BIOS) which may control basic hardware and/or software operation such as the interaction with peripheral components or devices.

Software 714 may include code to implement aspects of the present disclosure, including code to support the stationary device 705. Software 714 may be stored in a non-transitory computer-readable medium such as system memory or other memory. In some cases, the software 714 may not be directly executable by the processor but may cause a computer (e.g., when compiled and executed) to perform functions described herein.

I/O controller 716 may manage input and output signals for stationary device 705. I/O controller 716 may also manage peripherals not integrated into stationary device 705. In some cases, I/O controller 716 may represent a physical connection or port to an external peripheral. In some cases, I/O controller 716 may utilize an operating system such as iOS®, ANDROID®, MS-DOS®, MS-WINDOWS®, OS/2®, UNIX®, LINUX®, or another known operating system. In other cases, I/O controller 716 may represent or interact with a modem, a keyboard, a mouse, a touchscreen, or a similar device. In some cases, I/O controller 716 may be implemented as part of a processor. In some cases, a user may interact with the stationary device 705 via I/O controller 716 or via hardware components controlled by I/O controller 716.

The network endpoint 718 may be configured to communicate information using one or more different types of networks. For example, the network endpoint 718 may be configured to communicate data using an Ethernet network. In other examples, the network endpoint 718 may be configured to communicate data using a wireless network (e.g., Wi-Fi, cellular networks, BLUETOOTH®, WLANs, etc.). The network endpoint 718 may include a wired circuitry 720 (e.g., ethernet port), wireless circuitry 722 (e.g., for electromagnetic waves), an infrared transceiver 724, an ultrasonic transceiver (e.g., for sound waves), or a combination thereof.

The network endpoint 718 may be configured to communicate with audio output devices (e.g., mobile devices) and/or with legacy assistive listening systems. For example, the network endpoint 718 may be configured to communicate with the assistive listening system 315 described with reference to FIG. 3.

The network endpoint 718 may be configured to communicate settings for a control parameter from a computing device to an audio output device (e.g., a mobile device) as described with reference to FIG. 4. In some cases, the network endpoint 718 may establish communication links with both the computing device and the audio output device.

The wired circuitry 720 may be configured to communicate data over any wired network, which may include an Ethernet network. In some examples, the wired circuitry 720 may be an example of a Power over Ethernet (POE) port, such that electric power is received from the Ethernet network. As such, portions (or all) of the stationary device 705 may be powered using POE. The wired circuitry 720 may be an example of the Ethernet port 642 described with reference to FIGS. 6A and 6B.

The wireless circuitry 722 may include antennas and other electrical components configured to communicate data over a wireless network. The wireless circuitry 722 may be integrated into the stationary device 705. In some examples, the stationary device 705 may include an internal port (e.g., universal serial bus (USB) port) to couple to self-contained wireless transceivers and components (e.g., Wi-Fi stick). The wireless circuitry 722 may be configured to communicate electromagnetic signals in the radio frequency spectrum band. The information in those signals may be modulated and defined according to a wireless access technology.

The IR transceiver 724 may be configured to transmit or receive signals transmitted in the IR frequency spectrum band. An IR transmitter may be incorporated into another device, such as a remote. The IR transceiver 724 may be configured to receive IR signals and decode information included in the IR signals. The IR transceiver 724 may be an example of the IR transceiver described with reference to FIG. 6A.

The ultrasonic transceiver 726 may be configured to communicate using signals transmitted over sound waves in the ultrasonic frequency spectrum band. Ultrasonic signals may be communicated using frequencies outside of the range of normal human hearing. The stationary device 705 may include an ultrasonic transmitter to communicate data with other computing devices in the vicinity of the stationary device 705. Many microphones of computing devices (e.g., smartphones, cell phones, computing devices) are capable of detecting ultrasonic signals. In some examples, the stationary device 705 may transmit a message via ultrasonic signal. The stationary device 705 may include an ultrasonic transceiver to receive data from other computing devices in the vicinity of the stationary device 705. The ultrasonic transceiver 726 may be an example of the ultrasonic transceiver described with reference to FIGS. 6A and 6B. The ultrasonic transceiver 726 may include a speaker and a microphone.

The network endpoint 718 may communicate bi-directionally, via one or more antennas, wired, or wireless links as described above. For example, the network endpoint 718 may represent a wireless transceiver and may communicate bi-directionally with another wireless transceiver. The network endpoint 718 may also include a modem to modulate the packets and provide the modulated packets to the antennas for transmission, and to demodulate packets received from the antennas. The network endpoint 718 may communicate bi-directionally with the mobile device, computing device 782, the output device 784, the other systems 786, or a combination thereof. The network endpoint 718 may include a USB port, wireless network circuitry, other network components or ports, or a combination thereof. The wireless circuitry 722 may be configured to establish a wireless communication link via a wireless network. The other network components or ports may be any other type of communication circuitry to establish communications (either wired or wireless) between the stationary device 705. For example, the other network components may include components related to VGA, DVI, HDMI, IDE, SATA, eSATA, FireWire, Ethernet, PS/2, a serial connections, a RS-232 serial connection, a DB-25 serial connection, a DE-9 serial connection, an S-Video connection, a DIN connection, Wi-Fi, LTE, 3G, BLUETOOTH®, Bluetooth Low Energy, WLAN, WiGig, DECT, or a combination thereof.

The network endpoint 718 may be configured to communicate with a mobile device 780 using one or more wireless radio access technologies and/or one or more high-frequency audio techniques (e.g., sound waves). In some cases, the stationary device 705 may be configured to communicate using both radio frequency wireless access technologies and high-frequency audio techniques to establish and maintain device pairing.

The intercom endpoint 730 may be a terminal node of an intercom system or a public announcement system that is configured to communicate data with other endpoints and control points of the intercom system. The intercom endpoint 730 may be configured to interface with legacy intercom systems of a building. The intercom endpoint 730 of the stationary device 705 may include a data port 732. The data port 732 may be configured to establish a wired connection with the intercom system. The data port 732 may be an example of a component port 644 described with reference to FIG. 6B. The data port 732 may be an example of an R/L component audio port. The data port 732 may be an example of a component audio video port. In some examples, the data port 732 may include a component audio to HDMI converter.

As used herein, the term endpoint may refer to circuitry used to communicate data with an associated system. An endpoint may include ports and associated components to decode and encode information communicated through the port. As used herein, the term port may refer to any electrical connection, a port may sometimes be referred to as a connector. A port may include a male connector (e.g., protrusion) or a female connector (e.g., socket or receptacle). In some examples, the ports of the stationary device 705 are female connectors sized to receive corresponding male connectors associated with cables or other electronic components.

The audio/visual endpoint 740 may be a terminal node of an audio/visual system that is configured to communicate data with both content sources (e.g., computers, smartphones) and output devices (e.g., monitors, speakers). The audio/visual endpoint 740 may include a plurality of ports and associated circuitry to process data streams communicated through those ports. The audio/visual endpoint 740 may include one or more component ports 742, one or more I/O ethernet ports 744, one or more serial ports 746, one or more USB ports 748, one or more HDMI ports, other ports (e.g., the multi-pin port, network Ethernet port, or power port), or a combination thereof.

The audio/visual endpoint 740 may be dynamically changeable to include different combinations of ports and circuitry depending on the functions being performed. For example, the audio/visual endpoint 740 may be configured such that the stationary device 705 may serve as an in-line device between a content source (e.g., mobile device 780, computing device 782, etc.) and a display device (e.g., monitor). In other examples, the display device may include a projector system and/or a separate speaker system. In such instances, the audio/visual endpoint 740 may include the serial port 746 (to control one or more of the third party device) and/or the multi-pin connector to communicate data with the speakers.

The one or more component ports 742 may be examples of the component ports 644 described with reference to FIGS. 6A and 6B. The I/O ethernet ports 744 may be examples of the I/O ethernet ports 646 described with reference to FIGS. 6A and 6B. The serial port 746 may be configured to communicate information between the stationary device 705 and any number of devices (e.g., projectors or screens). Some devices are configured to receive instructions and other data in addition to receive streams of audio data and/or visual data. The serial port 746 may be configured to communicate these other types of information, data, and/or commands. The serial port 746 may be an example of an RS-232 port, in some cases. The serial port 746 may be an example of the serial port 650 described with reference to FIGS. 6A and 6B. The one or more USB ports 748 may be an example of the USB port 648 described with reference to FIGS. 6A and 6B.

User interface 760 may enable a user to interact with the stationary device 705. The user interface 760 may include one or more buttons 762, one or more indicator(s) 764, one or more screens 766, one or more speakers 768, one or more microphones 770, one or more cameras 772, other user I/O devices, or a combination thereof. In some examples, the user interface 760 may include display devices (e.g., TV, monitor, projector, screen), touchscreens, keyboards, mice, buttons, etc.

The button 762 may be configured to perform any number of functions. In some examples, the button 762 may be an example of reset button configured to reset/restart the stationary device 705 based on being actuated. The button 762 may be an example of the button 660 described with reference to FIG. 6B. In other examples, the stationary device 705 may include a plurality of buttons, such as a keypad, keyboard, or other collection of buttons. The button 762 may be configured to receive commands from a user.

The indicator(s) 764 may be configured to output information to the user. In some examples, the indicators 764 include a first indicator and a second indicator. The indicator 764 may be an example of a LED light. The indicator 764 may be an example of the indicators 656, 658 described with reference to FIG. 6B. In some examples, the indicators 764 may be any output device that is observable by a user. For example, the indicators 764 may be screens, displays, monitors, touchscreens, speakers, tactile devices, or a combination thereof.

The screen 766 may be configured to output images, text, or combinations thereof. The screen 766 may be an example of a plasma display, a liquid crystal display, an LED display, other displays, or a combination thereof. In some examples, the screen 766 may be an example of a touch display that is configured to receive inputs from a user. The screen 766 may be an example of the screen 520 described with reference to FIG. 5.

The speaker 768 may be configured to output sound or audio data into an area (e.g., a classroom). The speaker 768 may output data related to a presentation or data related to a PA system.

The microphone 770 may be configured to receive audio inputs from the area (e.g., the classroom). For example, the microphone may detect voice commands. In some cases, the microphone 770 may be used to establish two-way communication with another area of a premises.

The camera 772 may be configured to capture visual data of the area (e.g., the classroom). For example, the camera 772 may be used to establish a video chat with another area. In other examples, the camera 772 may capture images associated with security procedures of an area. The camera 772 may capture images in response to a panic signal or a paging signal being sent from the area.

The peripheral endpoint 774 is configured to communicate data with a variety of other systems. The peripheral endpoint 774 may include other ports 776. The peripheral endpoint 774 may be configured to communicate with telephone systems, emergency systems, power systems, speaker systems, other I/O devices, output devices, or a combination thereof.

The other ports may include power ports, multi-pin ports, serial ports, CAV ports, or a combination thereof. For example, a multi-pin port may be configured to include ten pins. The multi-pin port may be configured to communicate with speakers (two pins), to communicate with amplifiers (two pins), to communicate with microphones or other audio input devices (two pins), to communicate with other digital devices such as input buttons/actuators or indicators, or a combination thereof. The multi-pin port may be an example of the multi-pin port 652 described with reference to FIG. 6B. In some examples, the multi-pin port may be 10 pin phoenix port. The multi-pin port may be coupled to speaker out signals, microphone in signals, and other inputs and outputs.

The stationary device 705 may be configured to communicate data with a variety of different systems. For example, the stationary device 705 may be communicate with a mobile device 780, a computing device 782 (e.g., a laptop or a server), an output device 784, or other systems 786 via one of the endpoints or ports described herein.

In some examples, the mobile device 780 and/or computing device 782 may be considered a content source. As used herein, a content source may refer to any device or system that provides multimedia data (e.g., audio or visual) to the stationary device 705. The mobile device 780 and/or computing device 782 (e.g., content source) may be coupled to the stationary device 705 via one or more wired communication links, one or more wireless communication links (e.g., DECT or sound waves). For example, the mobile device 780 and/or computing device 782 may be a personal computer, a server, a cable box, a satellite box, an antenna, a smartphone, a hand-held computing device, tablet, etc.

In some examples, the stationary device 705 may communicate data with the computing device 782, which may include a laptop, desktop, server, or any combination thereof. For example, the computing device 782 may store multimedia data that the stationary device 705 receives and outputs to other output devices (e.g., displays and/or speakers). In some examples, the computing device 782 may store data output by the stationary device 705. In such examples, the stationary device 705 may intercept data from computers, displays, or other systems, and store that data.

The output device 784 may be any type of output device. For example, the output device 784 may be a screen, display, monitor, TV, projector system, other types of visual displays, speakers, other types of audio outputs, tactile outputs, or a combination thereof. For example, the stationary device 705 may couple with a projector using the component ports 742, the I/O ethernet ports 744, serial ports 746, USB ports, or a combination thereof. The serial port 746 may communicate other instructions or commands to the projector system.

The stationary device 705 may couple with other systems 786 such as, for example, an intercom system, a telephone system, an emergency response system, a security system, a building automation system, a climate control system, a lighting control system, an advertising system, or a combination thereof. The stationary device 705 may be coupled to these devices using a variety of combinations of endpoints and/or ports.

The stationary device 705 may also be configured to merge or combine different input streams from different sources into combined output streams. The stationary device 705 may be generated output data streams using low-latency processing. In such a manner, time delays between different devices may be reduced.

As used herein, the term low-latency may refer to procedures or processes that take an amount of time that is either not perceptible to users or is perceptible to users, but is inconsequential to the task being undertaken. For example, a low-latency processor or other device may be configured to process a video data stream received from a computing device during a time frame such that a user cannot perceive (or the perceived delay is inconsequential) a difference between the video data stream output by a monitor at the computing device and a video data stream output by different output device connected to the stationary device 705. In other examples, low-latency processing may refer to situations where two input data streams are merged with little to no perceived mismatch in timing of the two data streams.

In some examples, the stationary device 705 may be configured to minimize a latency between content received from the content source (e.g., mobile device 780 or computing device 782) and content presented on an output device 784. In such examples, the content source (e.g., mobile device 780 or computing device 782) may output a multimedia data stream (e.g., a video, an audio track, a power point presentation, etc.). The stationary device 705 may receive the multimedia data stream (e.g., using the audio/visual endpoint 740) and output the multimedia data stream to the output device 784 (e.g., using the audio/visual endpoint 740). By using low-latency processing, a time delay between content output at the content source (e.g., mobile device 780 or computing device 782) and content output at the output device 784 may be minimized. Other integration device may cause a delay to occur between the content source and the output device. Such a delay may impede multimedia presentations.

In some examples, the stationary device 705 may be configured to minimize latency between content output by two different systems. In such examples, the content source (e.g., mobile device 780 or computing device 782) may output a multimedia data stream (e.g., a video, an audio track, a power point presentation, etc.). The stationary device 705 may split and output the multimedia data stream to two separate systems (e.g., a display and a separate speaker system). Differences in processing and transmission between these two systems may cause the audio to be offset from the video. Such a mismatch during a multimedia presentation may be undesirable. The stationary device 705 may be configured to timestamp the multimedia data stream as it arrives and output the corresponding data streams to their respective systems based on the time states. In this manner, the stationary device 705 may ensure that the audio and video data that is output match in their timing.

In some examples, the stationary device 705 may be networked with other stationary devices 705 to provide a multi-location multimedia presentation. In multi-location presentations delays between different locations may be undesirable. For example, if the different locations are close to one another, a time delay in outputting content may cause a user in at a first location to hear an echo. For instance, if two classrooms are receiving the same presentation, the users in the classroom may hear the audio from both presentations, but the audio may be offset due to delays in processing. To address these time offsets, the stationary device 705 may be configured to execute low-latency processing to minimize the time offsets. In some examples, the stationary device 705 may time-stamp and buffer output data. The stationary device 705 may output its own data with a delay in order to sync the presentations with other rooms. The stationary device 705 may identify transmission delays associated with each of the connected other devices. In this manner, the time stamps on the output data may be used in conjunction with the identified transmission delays to sync multimedia presentations across multiple locations.

In some examples, the stationary device 705 may be configured to combine data from different systems into a single output data stream. In some instances, the output data stream may be H.264 Advanced Video Coding or H.265 Advanced Video Coding. Sometimes different types of input data streams may be processed differently. Such differences in processing may take differing amounts of time. Such processing differences may cause a mismatch of content in a combined data stream. To avoid a mismatch, the stationary device 705 may time stamp input data streams as they arrive. The stationary device 705 may buffer those input data streams. The stationary device 705 may merge the input data streams based on their time stamps. In this way, differences in processing for each input data stream may not create mismatch in the data in the resultant combined output data stream.

In some examples, the stationary device 705 may be configured to receive data via Point-to-Point data sharing service, such as AirDrop. Upon receiving data via a Point-to-Point data sharing service, the stationary device 705 may merge that data with other data and/or output that data to appropriate output devices as needed.

Figure 8:
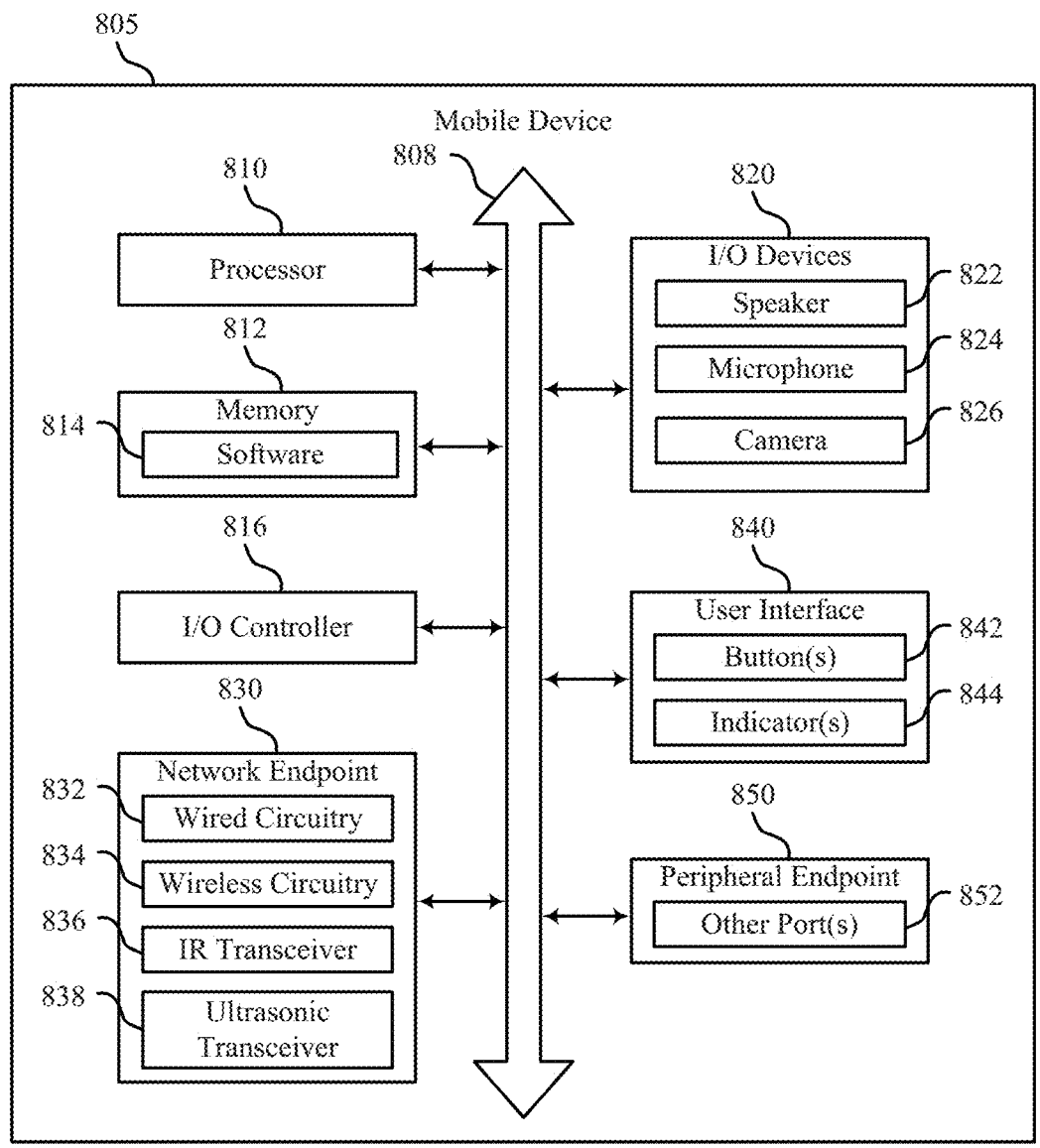
FIG. 8 illustrates a block diagram of a mobile device that supports central control, assistive listening, or a screen.

FIG. 8 illustrates a block diagram 800 of a mobile device 805 that supports central control, assistive listening, or a screen. The mobile device 805 may be an example of the mobile devices 105, 205, and 305, the audio output device 405, or the receivers 325 described with reference to FIGS. 1-4. The mobile device 805 may be configured to implement any of the functions or communication described with reference to FIGS. 1-4.

The mobile device 805 may include components for bi-directional voice and data communications including components for transmitting and receiving communications, including processor 810, memory 812, software 814, I/O controller 816, I/O devices 820, network endpoint 830, a user interface 840, and a peripheral endpoint 850. These components may be in electronic communication via one or more busses (e.g., bus 808).

In some cases, mobile device 805 may communicate with stationary device (e.g., stationary device 110 etc.) and/or one or more other input/output devices (e.g., computing device, server, tablet, smart phone, television, projector system, or monitor).

The signals associated with the mobile device 805 may include wireless communication signals such as radio frequency, electromagnetics, LAN, WAN, VPN, wireless network (using 802.11, for example), 345 MHz, Z-WAVE®, cellular network (using 3G and/or LTE, for example), DECT, and/or other signals. The RAT of the mobile device 805 may be related to, but are not limited to, WWAN (GSM, CDMA, and WCDMA), WLAN (including BLUETOOTH® and Wi-Fi), WiMAX, DECT, antennas for mobile communications, antennas for WPAN applications (including RFID and UWB).

Processor 810 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). Processor 810 may be configured to execute computer-readable instructions stored in a memory to perform various functions. In some examples, the processor 810 may be referred to as an integrator.

Memory 812 may include RAM and ROM. The memory 812 may store computer-readable, computer-executable software 814 including instructions that, when executed, cause the processor to perform various functions described herein. In some cases, the memory 812 may store the software 814 associated with the mobile device 805. In some cases, the memory 812 may contain, among other things, a BIOS which may control basic hardware and/or software operation such as the interaction with peripheral components or devices.

Software 814 may include code to implement aspects of the present disclosure, including code to support the mobile device 805. Software 814 may be stored in a non-transitory computer-readable medium such as system memory or other memory. In some cases, the software 814 may not be directly executable by the processor but may cause a computer (e.g., when compiled and executed) to perform functions described herein.

I/O controller 816 may manage input and output signals for mobile device 805. I/O controller 816 may also manage peripherals associated with the mobile device 805. In some cases, I/O controller 816 may represent a physical connection or port to an external peripheral. In some cases, I/O controller 816 may utilize an operating system such as iOS®, ANDROID®, MS-DOS®, MS-WINDOWS®, OS/2®, UNIX®, LINUX®, or another known operating system. In other cases, I/O controller 816 may represent or interact with a modem, a keyboard, a mouse, a touchscreen, or a similar device. In some cases, I/O controller 816 may be implemented as part of a processor. In some cases, a user may interact with the mobile device 805 via I/O controller 816 or via hardware components controlled by I/O controller 816. The I/O controller 816 may be configured to control the I/O devices 820 of the mobile device 805.

The mobile device 805 may include one or more I/O devices 820. Examples of the I/O devices may include one or more speakers 822, one or more microphones 824, one or more cameras 826, or a combination thereof. The speakers 822 and the microphones 824 may be configured to communicate sound waves with the stationary device.

The network endpoint 830 may be configured to communicate information using one or more different types of networks. For example, the network endpoint 830 may be configured to communicate data using a wireless network (e.g., Wi-Fi, cellular networks, BLUETOOTH®, WLANs, etc.). The network endpoint 830 may include a wired circuitry 832 (e.g., ethernet port), wireless circuitry 834 (e.g., for electromagnetic waves), an infrared transceiver 836, an ultrasonic transceiver (e.g., for sound waves), or a combination thereof.

The network endpoint 830 may be configured to receive audio data from the stationary device as part of an assistive listening system. The network endpoint 830 may be configured to receive settings for control parameters from the stationary device. In some case, the network endpoint 830 may be configured to receive settings for control parameters from an input component and may perform conflict resolution procedures to determine which setting to use.

The wired circuitry 832 may be configured to communicate data over any wired network. In some examples, the wired circuitry 832 may be an example of USB port.

The wireless circuitry 834 may include antennas and other electrical components configured to communicate data over a wireless network. The wireless circuitry 834 may be integrated into the mobile device 805. The wireless circuitry 834 may be configured to communicate electromagnetic signals in the radio frequency spectrum band. The information in those signals may be modulated and defined according to a wireless access technology.

The IR transceiver 836 may be configured to transmit or receive signals transmitted in the IR frequency spectrum band. The IR transceiver 836 may be configured to transmit IR signals.

The ultrasonic transceiver 838 may be configured to communicate using signals transmitted over sound waves in the ultrasonic frequency spectrum band. Ultrasonic signals may be communicated using frequencies outside of the range of normal human hearing. The mobile device 805 may include an ultrasonic transmitter to communicate data with other computing devices in the vicinity of the mobile device 805. Many microphones of computing devices (e.g., smartphones, cell phones, computing devices) are capable of detecting ultrasonic signals. In some examples, the mobile device 805 may transmit a message via ultrasonic signal. The mobile device 805 may include an ultrasonic transceiver to receive data from other computing devices in the vicinity of the mobile device 805. The ultrasonic transceiver 838 may include a speaker and a microphone.

The network endpoint 830 may communicate bi-directionally, via one or more antennas, wired, or wireless links as described above. For example, the network endpoint 830 may represent a wireless transceiver and may communicate bi-directionally with another wireless transceiver. The network endpoint 830 may also include a modem to modulate the packets and provide the modulated packets to the antennas for transmission, and to demodulate packets received from the antennas. The network endpoint 830 may communicate bi-directionally with the stationary device or other input/output device. The wireless circuitry 834 may be configured to establish a wireless communication link via a wireless network. The other network components or ports may be any other type of communication circuitry to establish communications (either wired or wireless) between the mobile device 805. For example, the other network components may include components related to Wi-Fi, LTE, 3G, BLUETOOTH®, Bluetooth Low Energy, WLAN, WiGig, DECT, or a combination thereof.

The network endpoint 830 may be configured to communicate with a stationary device using one or more wireless radio access technologies and/or one or more high-frequency audio techniques (e.g., sound waves). In some cases, the mobile device 805 may be configured to communicate using both radio frequency wireless access technologies and high-frequency audio techniques to establish and maintain device pairing.

User interface 840 may enable a user to interact with the mobile device 805. The user interface 840 may include one or more buttons 842, one or more indicator(s) 844, other user I/O devices, or a combination thereof. In some examples, the user interface 840 may include speakers, display devices (e.g., TV, monitor, projector), touchscreens, keyboards, mice, buttons, microphone, etc. The user interface 840 may be configured as an input component that receives inputs from a user or wearer of the mobile device when it is being used as an audio output device.

The button(s) 842 may be configured to perform any number of functions. In some examples, the button(s) 842 may be an example of reset button configured to reset/restart the mobile device 805 based on being actuated. In other examples, the mobile device 805 may include a plurality of buttons, such as a keypad, keyboard, or other collection of buttons. The button(s) 842 may be configured to receive commands from a user.

The indicator(s) 844 may be configured to output information to the user. In some examples, the indicator(s) 844 include a first indicator and a second indicator. The indicator(s) 844 may be an example of a LED light. In some examples, the indicator(s) 844 may be any output device that is observable by a user. For example, the indicator(s) 844 may be screens, displays, monitors, touchscreens, speakers, tactile devices, or a combination thereof.

The peripheral endpoint 850 is configured to communicate data with a variety of other systems. The peripheral endpoint 850 may include other ports 852. The peripheral endpoint 850 may be configured to communicate with telephone systems, emergency systems, power systems, speaker systems, other I/O devices, output devices, or a combination thereof. The other ports may include power ports or USB ports or a combination thereof.

Figure 9:
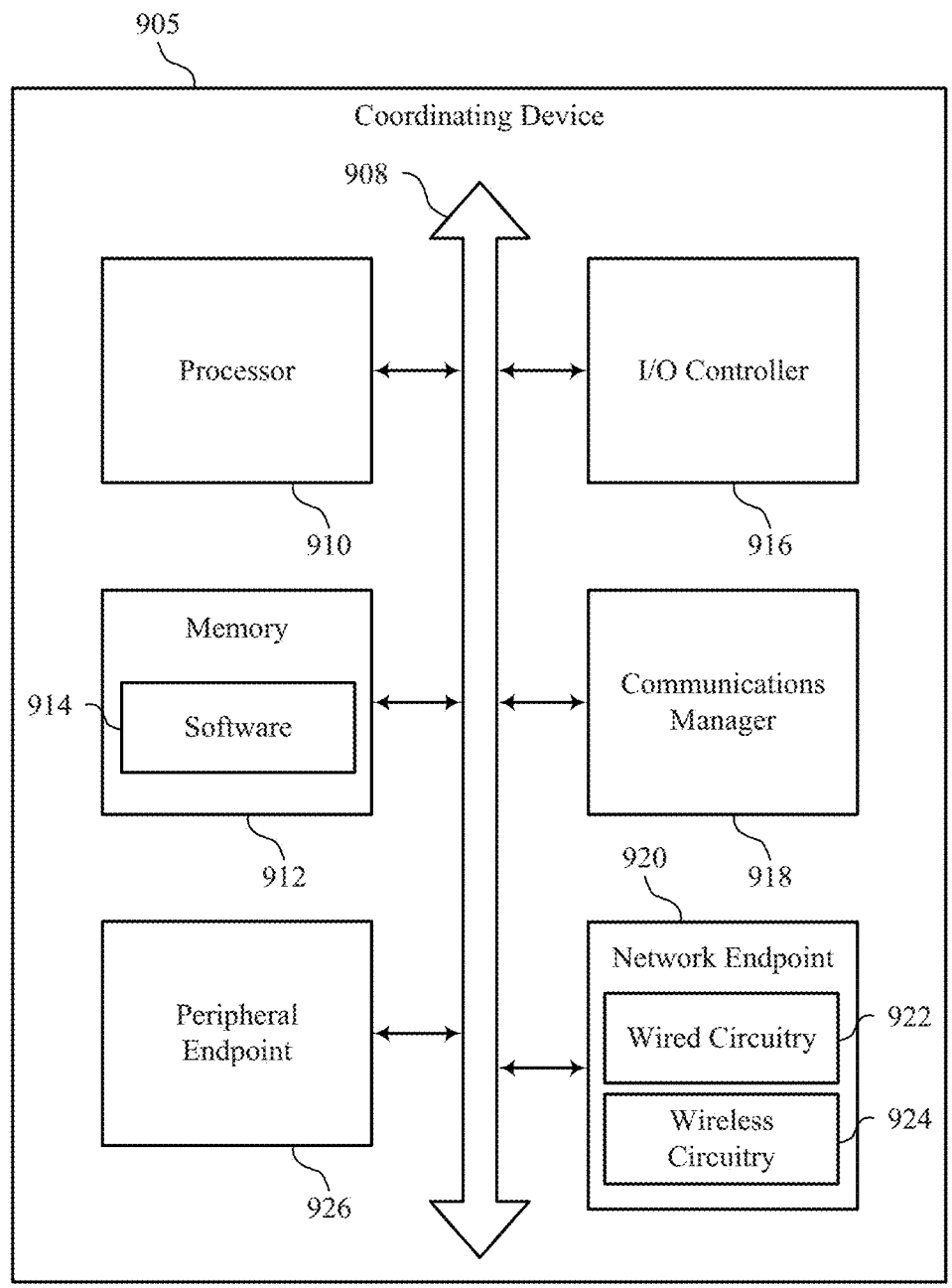
FIG. 9 illustrates a block diagram of a coordinating device that supports central control, assistive listening, or a screen.

FIG. 9 illustrates a block diagram 900 of a coordinating device 905 that supports central control, assistive listening, or a screen. The coordinating device 905 may be an example of the coordinating device 115 described with reference to FIG. 1. The coordinating device 905 may be configured to implement any of the functions or communication described with reference to FIGS. 1-4.

The coordinating device 905 may be an example of a computing device or server configured to perform the functions described herein. The coordinating device 905 may be positioned at a premises (e.g., a school or office) and may be configured to manage communication networks between stationary devices and/or mobile devices. In some cases, the functions of the coordinating device 905 may be implemented by a stationary device. In such cases, the coordinating device 905 may include some of the features or characteristics of the stationary device 705 described with reference to FIG. 7. In other cases, the coordinating device 905 may be independent from the stationary devices.

The coordinating device 905 may include components for bi-directional voice and data communications including components for transmitting and receiving communications, including processor 910, memory 912, software 914, I/O controller 916, communications manager 918, network endpoint 920, and peripheral endpoint 926. These components may be in electronic communication via one or more busses (e.g., bus 908). In some cases, coordinating device 905 may communicate with stationary devices (e.g., stationary device 110 etc.) and/or one or more other input/output devices (e.g., computing device, server, tablet, smart phone, television, projector system, or monitor).

The signals associated with the coordinating device 905 may include wired communication signals such as those communicated over an ethernet network or other type of wired network. In some cases, the coordinating device 905 may have multiple wired connections with a single stationary device. For example, the coordinating device 905 may be coupled with the stationary device over an ethernet network and over a public announcement system. In some cases, the coordinating device 905 may communicate using wireless communication signals such as radio frequency, electromagnetics, LAN, WAN, VPN, wireless network (using 802.11, for example), 345 MHz, Z-WAVE®, cellular network (using 3G and/or LTE, for example), DECT, and/or other signals. The RAT of the coordinating device 905 may be related to, but are not limited to, WWAN (GSM, CDMA, and WCDMA), WLAN (including BLUETOOTH® and Wi-Fi), WiMAX, DECT, antennas for mobile communications, antennas for WPAN applications (including RFID and UWB).

Processor 910 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). Processor 910 may be configured to execute computer-readable instructions stored in a memory to perform various functions. In some examples, the processor 910 may be referred to as an integrator.

Memory 912 may include RAM and ROM. The memory 912 may store computer-readable, computer-executable software 914 including instructions that, when executed, cause the processor to perform various functions described herein. In some cases, the memory 912 may store the software 914 associated with the coordinating device 905. In some cases, the memory 912 may contain, among other things, a BIOS which may control basic hardware and/or software operation such as the interaction with peripheral components or devices.

Software 914 may include code to implement aspects of the present disclosure, including code to support the coordinating device 905. Software 914 may be stored in a non-transitory computer-readable medium such as system memory or other memory. In some cases, the software 914 may not be directly executable by the processor but may cause a computer (e.g., when compiled and executed) to perform functions described herein.

I/O controller 916 may manage input and output signals for coordinating device 905. I/O controller 916 may also manage peripherals associated with the coordinating device 905. In some cases, I/O controller 916 may represent a physical connection or port to an external peripheral. In some cases, I/O controller 916 may utilize an operating system such as iOS®, ANDROID®, MS-DOS®, MS-WINDOWS®, OS/2®, UNIX®, LINUX®, or another known operating system. In other cases, I/O controller 916 may represent or interact with a modem, a keyboard, a mouse, a touchscreen, or a similar device. In some cases, I/O controller 916 may be implemented as part of a processor. In some cases, a user may interact with the coordinating device 905 via I/O controller 916 or via hardware components controlled by I/O controller 916.

The communications manager 918 may manager functions or communications of the coordinating device 905 with one or more other devices. In some cases, the communications manager 918 may receive, from the stationary device, the second alert signal over the communication link, identify a third location associated with the mobile device based at least in part on receiving the second alert signal from the stationary device at the first location, and activate one or more devices at the third location based at least in part on receiving the second alert signal from the stationary device.

In some cases, the communications manager 918 may cause another device to record, using one or more cameras at the third location, visual data or audio data or both based at least in part on receiving the second alert signal. In some cases, the communications manager 918 may cause another device to record, using one or more microphones at the third location, audio data within the frequency range detectible by the human ear based at least in part on receiving the second alert signal. In some cases, the communications manager 918 may cause another device to broadcast, using one or more speakers at the third location, a message within the frequency range detectible by the human ear based at least in part on receiving the second alert signal.

In some cases, the communications manager 918 may receive, from a second stationary device, a third alert signal over the second communication link, where identifying the third location of the mobile device is based at least in part on receiving the third alert signal from the second stationary device at the fourth location.

The network endpoint 920 may be configured to communicate information using one or more different types of networks. For example, the network endpoint 920 may be configured to communicate data using a wireless network (e.g., Wi-Fi, cellular networks, BLUETOOTH®, WLANs, etc.). The network endpoint 920 may include a wired circuitry 922 (e.g., ethernet port), wireless circuitry 924 (e.g., for electromagnetic waves), or a combination thereof.

The network endpoint 920 may be configured to coordinate communications between stationary devices, between mobile devices, and/or between one or more stationary device and one or more mobile devices. For example, the network endpoint 920 may facilitate communications between a stationary device and a legacy assistive system. In other examples, the network endpoint 920 may be configured to facilitate communications of setting information about control parameters of a mobile device or an audio output device.

The wired circuitry 922 may be configured to communicate data over any wired network, which may include an Ethernet network. In some examples, the wired circuitry 922 may be an example of a Power over Ethernet (POE) port, such that electric power is transmitted or received over the Ethernet network. As such, portions (or all) of the coordinating device 905 may be powered using POE.

The wireless circuitry 924 may include antennas and other electrical components configured to communicate data over a wireless network. The wireless circuitry 924 may be integrated into the coordinating device 905. The wireless circuitry 924 may be configured to communicate electromagnetic signals in the radio frequency spectrum band. The information in those signals may be modulated and defined according to a wireless access technology.

The network endpoint 920 may communicate bi-directionally, via one or more antennas, wired, or wireless links as described above. For example, the network endpoint 920 may represent a wireless transceiver and may communicate bi-directionally with another wireless transceiver. The network endpoint 920 may also include a modem to modulate the packets and provide the modulated packets to the antennas for transmission, and to demodulate packets received from the antennas. The network endpoint 920 may communicate bi-directionally with the stationary device or other input/output device. The wireless circuitry 924 may be configured to establish a wireless communication link via a wireless network. The other network components or ports may be any other type of communication circuitry to establish communications (either wired or wireless) between the coordinating device 905. For example, the other network components may include components related to Wi-Fi, LTE, 3G, BLUETOOTH®, Bluetooth Low Energy, WLAN, WiGig, DECT, or a combination thereof.

The peripheral endpoint 926 is configured to communicate data with a variety of other systems. The peripheral endpoint 926 may include other ports. The peripheral endpoint 926 may be configured to communicate with telephone systems, emergency systems, power systems, speaker systems, other I/O devices, output devices, or a combination thereof.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), CD ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system, comprising:
   a stationary device communicatively coupled with one or more devices for inputting multimedia content into or outputting multimedia content relative to a classroom, the stationary device configured to transmit audio content to the one or more devices using a first radio access technology, the stationary device configured to pair with the one or more devices by exchanging a plurality of signals over a plurality of sound waves operating in a first set of frequencies above a frequency range detectable by a human ear;
   an assistive listening system comprising a transmitter and one or more receivers, the transmitter configured to receive the audio content from the stationary device over a first wireless communication link that uses the first radio access technology and transmit the audio content to the one or more receivers over a second wireless communication link that uses a second radio access technology different than the first radio access technology, the one or more receivers configured to output the audio content to a user; and an audio output device communicatively coupled with the stationary device and configured to receive the audio content from the stationary device over a third wireless communication link that uses the first radio access technology and configured to output the audio content to the user.

2. The system of claim 1, wherein the audio output device is independent from the assistive listening system.

3. The system of claim 1, wherein the stationary device is configured to:
receive the audio content from at least one device of the one or more devices for inputting or outputting the multimedia content relative to the classroom;
identify that the audio content is part of a presentation that includes assistive listening; and
transmit the audio content to the transmitter of the assistive listening system over the first communication link and the audio output device over the second communication link different than the first communication link.

4. The system of claim 1, wherein the assistive listening system is a legacy assistive listening system.

5. The system of claim 1, wherein the stationary device, the one or more receivers, and the audio output device are positioned in the classroom.

6. The system of claim 1, wherein the one or more receivers and the audio output device are configured as assistive listening devices for a presentation output by the stationary device over a duration.

7. An audio/visual integration device for a classroom, comprising:
a first audio/visual endpoint coupled with a first content source of the classroom, the first audio/visual endpoint configured to receive a first audio/visual data stream from the first content source;
a second audio/visual endpoint coupled with a public announcement (PA) system of the classroom, the second audio/visual endpoint configured to receive a second audio/visual data stream from the PA system;
a speaker for outputting audio data associated with the first audio/visual data stream or the second audio/visual data stream into the classroom;
a screen to display text or images associated with the first audio/visual data stream or the second audio/visual data stream into the classroom; and
an ultrasonic transceiver configured to exchange, with a device, a plurality of signals over a plurality of sound waves operating in a first set of frequencies above a frequency range detectible by a human ear to establish a wireless communication link that uses electromagnetic waves with the device.

8. The audio/visual integration device of claim 7, wherein the screen is configured to output a text representation of the audio data output from the speaker.

9. The audio/visual integration device of claim 7, further comprising:
a microphone for receiving voice commands from users positioned in the classroom.

10. The audio/visual integration device of claim 7, further comprising:
a camera for capturing visual data of the classroom.

11. The audio/visual integration device of claim 7, wherein:
the speaker is configured to output an auditory alert in response to receiving an alert signal; and
the screen is configured to output a visual alert in response to receiving the alert signal.

12. The audio/visual integration device of claim 7, wherein the screen is configured to display a time of day, a date, a weather report, a timer, or a combination thereof.

13. A system, comprising:
a stationary device positioned in a classroom and communicatively coupled with one or more devices for inputting or outputting multimedia content relative to the classroom, the stationary device configured to:
receive, from a device, a first signal indicating a volume control level of an audio output device; and
transmit, to the audio output device, a second signal indicating the volume control level received from the device; and
the audio output device positioned in the classroom and communicatively coupled with the stationary device, the audio output device configured to:
receive, from the stationary device, the second signal indicating the volume control level;
receive, from an input component of the audio output device, a second volume control level different than the volume control level;
determine a relative priority of the volume control level and the second volume control level based at least in part on a source of each volume control level;
select the volume control level or the second volume control level as the output volume based at least in part on determining the relative priority; and
output, to a user of the audio output device, audio data at an output volume indicated by the volume control level.

14. The system of claim 13, wherein:
the stationary device configured to:
receive, from the device, a third signal indicating a source of the audio data output by the audio output device; and
the audio output device positioned in the classroom and communicatively coupled with the stationary device, the audio output device configured to:
receive, from the stationary device, the third signal indicating the source of the audio data; and
output, to the user of the audio output device, the audio data from the source indicated by the third signal.

15. The system of claim 13, wherein the audio output device is further configured to:
determine an upper limit of the output volume based at least in part on the volume control level received from the stationary device.

16. The system of claim 13, wherein the audio output device is further configured to:
determine a lower limit of the output volume based at least in part on the volume control level received from the stationary device.

17. The system of claim 13, wherein the second signal is communicated using Digital Enhanced Cordless Telecommunications (DECT) protocols.

* * * * *